United States Patent
Yoon et al.

(10) Patent No.: US 11,268,647 B2
(45) Date of Patent: Mar. 8, 2022

(54) CLAMP FOR PIPE

(71) Applicant: SAMSUNG HEAVY IND. CO., LTD., Seongnam-si (KR)

(72) Inventors: Byoung Young Yoon, Geoje-si (KR); Min Jung Lee, Geoje-si (KR); Ryeon Ha Choi, Geoje-si (KR); Chae Seon Lim, Geoje-si (KR); Hyun Soo Kim, Geoje-si (KR); Jun Ho Ha, Geoje-si (KR)

(73) Assignee: Samsung Heavy Ind. Co., Ltd.

( * ) Notice: Subject to any disclaimer, the term of this patent is extended or adjusted under 35 U.S.C. 154(b) by 834 days.

(21) Appl. No.: 15/762,793

(22) PCT Filed: Sep. 23, 2016

(86) PCT No.: PCT/KR2016/010722
§ 371 (c)(1),
(2) Date: Mar. 23, 2018

(87) PCT Pub. No.: WO2017/052312
PCT Pub. Date: Mar. 30, 2017

(65) Prior Publication Data
US 2018/0266617 A1    Sep. 20, 2018

(30) Foreign Application Priority Data

Sep. 25, 2015 (KR) .......... 10-2015-0136538
Nov. 6, 2015 (KR) .......... 10-2015-0155817
(Continued)

(51) Int. Cl.
*F16L 58/00* (2006.01)
*C23F 13/18* (2006.01)
(Continued)

(52) U.S. Cl.
CPC .............. *F16L 58/00* (2013.01); *C23F 13/10* (2013.01); *C23F 13/18* (2013.01); *F16L 3/1091* (2013.01);
(Continued)

(58) Field of Classification Search
CPC ..... F16L 58/00; F16L 58/1054; F16L 3/1091; F16L 3/04; F16L 3/08; F16L 3/1016;
(Continued)

(56) References Cited

U.S. PATENT DOCUMENTS

| 4,872,860 A | 10/1989 | Meisenburg |
| 2012/0006948 A1 | 1/2012 | Hiss et al. |

(Continued)

FOREIGN PATENT DOCUMENTS

| JP | S53-012098 A | 2/1978 |
| JP | S56-136440 U | 10/1981 |

(Continued)

OTHER PUBLICATIONS

International Search Report dated Nov. 28, 2016.
Extended European Search Report for Application No. EP 16 84 9037 dated May 3, 2019 (8 pages).

*Primary Examiner* — James M Hewitt, II
(74) *Attorney, Agent, or Firm* — Harness, Dickey & Pierce, P.L.C.

(57) ABSTRACT

A clamp for a pipe includes: a crevice corrosion-resistant member surrounding the outer surface of the pipe; and a body that is assembled to allow the crevice corrosion-resistant member to be disposed inside thereof and has opening walls formed at both ends thereof, each of the opening walls having an opening hole through which the pipe passes, wherein the crevice corrosion-resistant member is provided to have the same length as a distance between the opening walls, and thus ends of the crevice corrosion-
(Continued)

resistant member can be supported by the opening walls, respectively.

3 Claims, 24 Drawing Sheets

(30) Foreign Application Priority Data

| Nov. 6, 2015 | (KR) | ......................... 10-2015-0155891 |
| Nov. 6, 2015 | (KR) | ......................... 10-2015-0155898 |
| Sep. 20, 2016 | (KR) | ......................... 10-2016-0119818 |

(51) Int. Cl.
*F16L 58/10* (2006.01)
*F16L 3/10* (2006.01)
*C23F 13/10* (2006.01)
*F16L 3/04* (2006.01)

(52) U.S. Cl.
CPC ...... *F16L 58/1054* (2013.01); *C23F 2213/32* (2013.01); *F16L 3/04* (2013.01)

(58) Field of Classification Search
CPC ......... F16L 3/1033; F16L 58/18; C23F 13/18; C23F 13/10; C23F 2213/32; C23F 13/005; C23F 13/02; C23F 13/08
See application file for complete search history.

(56) References Cited

U.S. PATENT DOCUMENTS

| 2012/0056634 | A1  | 3/2012  | Bohon et al. |
| 2012/0315082 | A1* | 12/2012 | Linzell ................ B23K 20/021 |
|              |     |         | 403/270 |
| 2017/0234080 | A1* | 8/2017  | Wang ..................... E21B 17/02 |
|              |     |         | 405/184.1 |

FOREIGN PATENT DOCUMENTS

| JP | 2005-147182 A | 6/2005 |
| KR | 10-1422171 | 7/2014 |
| WO | WO-2013-049495 A2 | 4/2013 |
| WO | WO-2013-084433 A1 | 6/2013 |

\* cited by examiner

CLAMP FOR PIPE

FIELD OF THE INVENTION

The present invention relates to a clamp for a pipe.

BACKGROUND OF THE INVENTION

Generally, a floating type structure such as a ship, a drillship, and an FPSO (Floating Production Storage Offloading) facility is provided with a pipe facility for transferring working fluid such as gas, oil or the like.

For example, a drilling equipment such as derrick or the like may be mounted on the drillship, and lubricating oil may be provided through a pipe in order to smoothly drive a drill for drilling an ocean floor. At this time, the pipe should be fixed without shaking for long distance transfer of the lubricating oil. Thus, the pipe may be fixed by clamps.

The clamps are installed at a regular interval along a longitudinal direction of the pine based on a ship design rule to firmly support the pipe. In the case of pipes extending to the underground of several tens to several hundreds of meters or less, it is difficult for operators to access the pipes and perform maintenance thereof. If the pipes are damaged by corrosion or the like, the working fluid may leak from a damaged portion.

Therefore, it is required to manage the pipe and the clamp for the pipe to prevent corrosion thereof. Accordingly, a pipe through which the working fluid is transferred is made of stainless steel or various metal materials, and the clamp for a pipe may be made of a plastic material.

A conventional clamp for a pipe has a structure in which a large area thereof is brought into contact with an outer circumferential surface of the pipe in order to improve supporting force. At this time, however, crevice corrosion may occur on the outer circumferential surface of the pipe which is brought into contact with the clamp for a pipe. The crevice corrosion is electrochemical corrosion that occurs due to an ion concentration difference caused by aqueous solution flowing into a gap between metals or a gap between a metal and another material.

When the crevice corrosion proceeds on the outer circumferential surface of the pipe which is brought into contact with the clamp for a pipe, the crevice corrosion may not be recognized because it is not visible to naked eyes. Accordingly, the crevice corrosion may lead to generation of holes in the pipe.

SUMMARY OF THE INVENTION

In view of the above, the present invention provides a clamp for a pipe which can minimize crevice corrosion caused by contact with external moisture and oxygen.

In accordance with an aspect of the present invention, there is provided a clamp for a pipe, including: a crevice corrosion prevention member configured to surround an outer surface of a pipe; and a body that is assembled to allow the crevice corrosion prevention member to be disposed therein and has opening walls formed at opposite ends thereof, the pipe passing through the opening walls, wherein the crevice corrosion prevention member has a length that is the same as a distance between the opening walls, and ends of the crevice corrosion prevention member are supported by the opening walls.

The crevice corrosion prevention member may contain an aluminum alloy having an oxide film on a surface thereof.

An inner diameter of the crevice corrosion prevention member may be smaller than an inner diameter of the opening hole.

The opening hole may have an inclined surface inclined such that an outside inner diameter thereof is greater than an inside inner diameter thereof.

Stepped portions may be formed at the ends of the crevice corrosion prevention member, and the stepped portions of the crevice corrosion prevention member may be supported at the opening holes of the opening walls through which the pipe passes.

The stepped portions of the crevice corrosion prevention member may be in contact with and supported by an inner surface of the opening hole without being exposed to the outside of the body.

The stepped portions may have surfaces inclined such that an outside inner diameter thereof is greater than an inside inner diameter thereof.

The crevice corrosion prevention member may include: a first prevention member configured to surround an upper outer diameter surface of the pipe and supported at the opening hole by the stepped portions; and a second prevention member configured to surround a lower outer diameter surface of the pipe and supported at the opening hole by the stepped portions.

The crevice corrosion prevention member may include: a rust preventing portion containing a metal having higher reactivity than reactivity of the pipe and configured to surround a circumferential surface of the pine; and an outer circumference protecting portion configured to surround an outer circumferential surface of the rust preventing portion.

The body may include a first body and a second body assembled to surround a circumferential surface of the pipe, wherein the first body and the second body have therein supporting portions having a shape corresponding to at least a part of an outer circumferential surface of the crevice corrosion prevention member so that the crevice corrosion prevention member is mounted.

The rust preventing portion may have a length smaller than a length of the outer circumference protecting portion.

The crevice corrosion prevention member may further include a finishing protecting portion having an inner circumferential surface shaped to correspond to a shape of the circumferential surface of the pipe, wherein the finishing protecting portion is provided at both sides in a longitudinal direction of the rust preventing portion, and an outer circumferential surface of the finishing protecting portion is brought into close contact with an inner circumferential surface of the outer circumference protecting portion.

Both end portions of the crevice corrosion prevention member may be bent toward the body and inserted into the body, the body may include a first body and a second body having corresponding shapes and assembled to surround the circumferential surface of the pipe, and the first body and the second body may have supporting portions that are depressed so that the crevice corrosion prevention member is mounted.

The crevice corrosion prevention member may include: a first preventing member mounted on the supporting portion of the first body and configured to be in contact with a part of an outer circumferential surface of the pipe; and a second prevention member mounted on the supporting portion of the second body and configured to be in contact with part of the outer circumferential surface of the pipe which is not in contact with the first prevention member.

The first prevention member and the second prevention member may include: corrosion portions having a shape corresponding to the outer circumferential surface of the pipe and having an inner surface to be in contact with the outer circumferential surface of the pipe; connection portion extended outward in a radial direction from the corrosion portions; and flange portions bent from end portions of the connection portion toward the first body or the second body.

Effects of the Invention

The embodiments of the present invention are advantageous in that the crevice corrosion of the pipe can be effectively prevented. This is because the crevice corrosion prevention member is made of an aluminum alloy having an oxide film on a surface thereof and thus is corroded earlier than the pipe after the oxide film is damaged under an environment in which crevice corrosion occurs. Accordingly, the operational life time of the pipe can be considerably increased.

Further, the embodiments of the present invention are advantageous in that the crevice corrosion can be prevented. This is because the stepped portions of the crevice corrosion prevention member are corroded earlier than other portions of the crevice corrosion prevention member except the stepped portions and, thus, a space is not generated between the pipe and the body. Especially, the pipe is effectively supported by the body and, thus, the supporting force can be maintained.

Further, the embodiments of the present invention are advantageous in that the contact with external moisture and oxygen can be minimized because the crevice corrosion prevention member is not exposed in the body.

Further, the embodiments of the present invention are advantageous in that the crevice corrosion prevention member can be easily fixed to the body and an additional fixing device for fixing the crevice corrosion prevention member is not required because the ends of the crevice corrosion prevention member are supported by the opening walls of the body.

Further, the embodiments of the present invention are advantageous in that it is possible to prevent corrosion products generated by the corrosion of the crevice corrosion prevention member from being generated inside the clamp by forming a coating layer on the outer circumferential surface of the pipe except the surface to be in contact with the crevice corrosion prevention member. Accordingly, the life time of the crevice corrosion prevention member can be increased.

DETAILED DESCRIPTION OF THE EMBODIMENTS

Hereinafter, configurations and operations of embodiments will be described in detail with reference to the accompanying drawings. The following description is one of several aspects of the present invention which can be claimed, and the following description can form a part of detailed description of the present invention. In the description of the present invention, detailed descriptions of known configurations or functions, which may unnecessarily obscure the essentials of the present invention, will be omitted.

Figure 1:
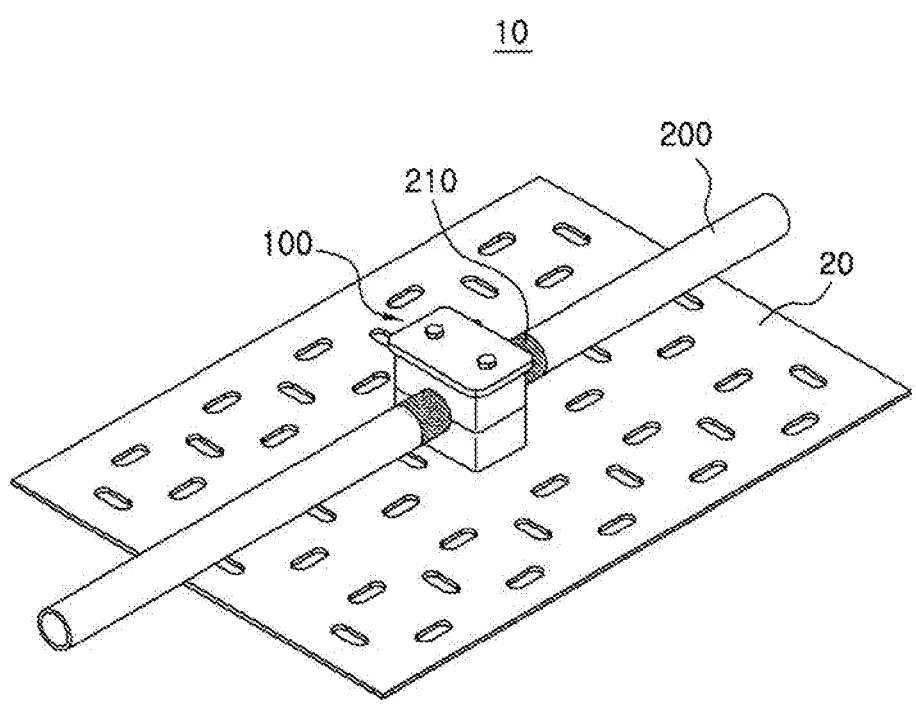
FIG. 1 is a perspective view of a pipe facility according to a first embodiment of the present invention.
Figure 2:
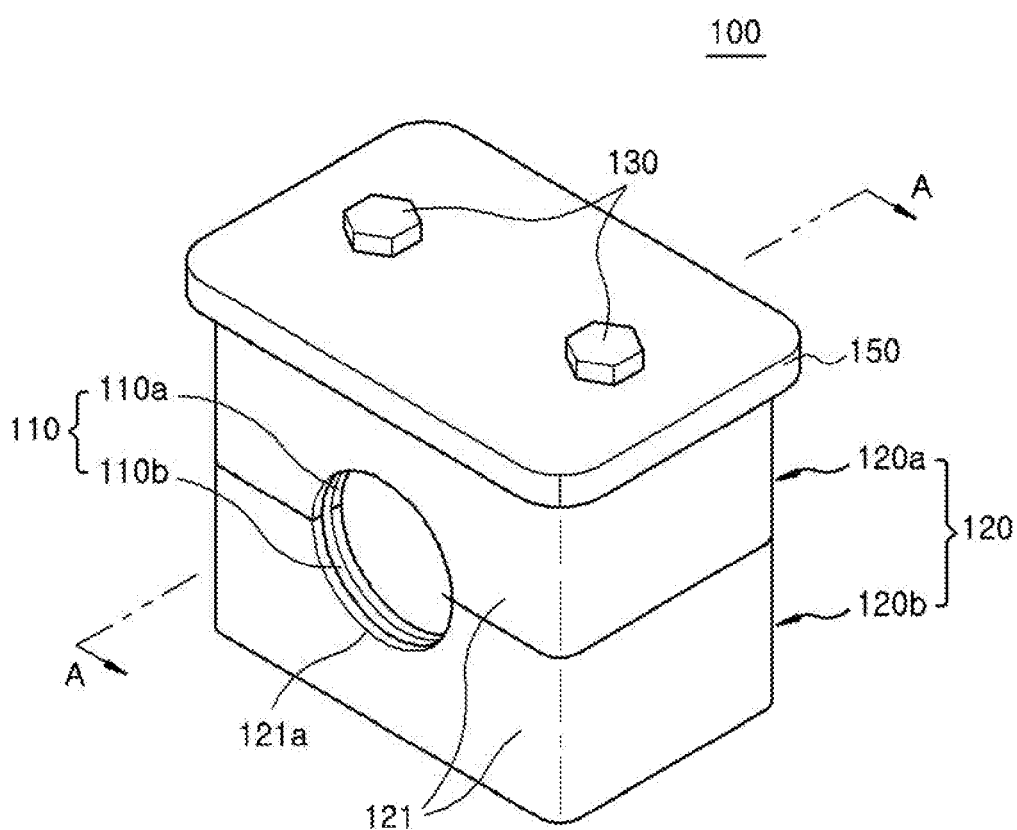
FIG. 2 is a perspective view of a clamp for a pipe according to the first embodiment.
Figure 3:
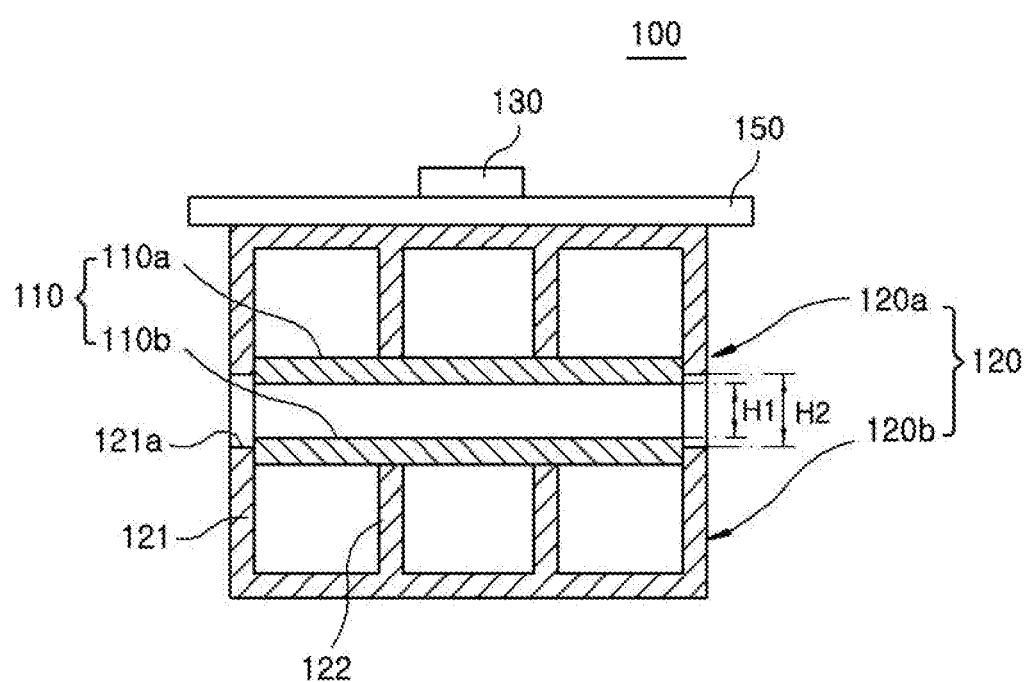
FIG. 3 is a cross sectional view taken along a line "A-A" in FIG. 2.
Figure 4:
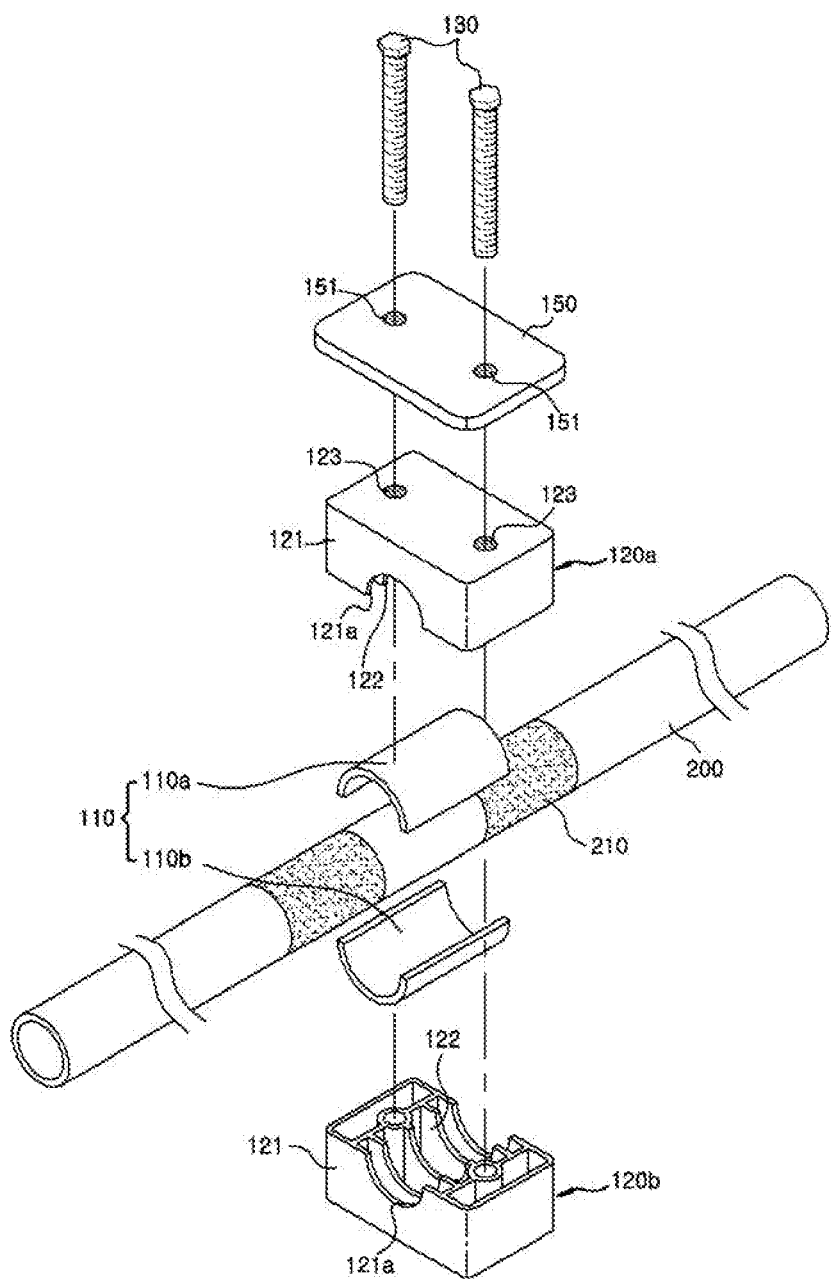
FIG. 4 is an exploded perspective view of the clamp for a pipe according to the first embodiment.

FIG. 1 is a perspective view of a pipe facility according to a first embodiment of the present invention. FIG. 2 is a perspective view of a clamp for a pipe according to the first embodiment. FIG. 3 is a cross sectional view taken along a line "A-A" in FIG. 2. FIG. 4 is an exploded perspective view of the clamp for a pipe according to the first embodiment.

As shown in FIGS. 1 to 4, a clamp 100 for a pipe according to the first embodiment may include a crevice corrosion prevention member 110 surrounding an outer surface of a pipe 200 and a body 120 that is assembled to the crevice corrosion preventing member 110 such that ends of the crevice corrosion prevention member 110 can be supported.

Here, the pipe 200 is a pipe (or tube) used for long distance transfer of oil, gas or the like and made of stainless steel various alloys having high corrosion resistance and high strength. The 200 has a conduit for transferring fluid which is formed in a longitudinal direction. Further, the pipe 200 may be fixed through the clamp 100 to an installation region 20 such as a plate or the like.

The body 120 can fix the pipe 200 to the installation region 20 or connect a plurality of pipes 200. The body 120 may be a hexahedral housing, and an opening wall 121 having an opening hole 121a may be provided at opposite ends of the body 120. At this time, the opening hole 121a has a shape corresponding to that of an outer circumferential surface of the pipe 200. An inner diameter of the opening hole 121a is greater than an outer diameter of the pipe 200 at least by a distance enough to prevent generation of crevice corrosion. For example, the distance between the inner diameter of the opening hole 121a and the outer diameter of the pipe 200 can be maintained at a level of about 100 microns or more.

A rib 122 for supporting an outer surface of the crevice corrosion prevention member 110 may be provided inside the body 120. There may be provided one or more ribs 122. An end portion of the rib 122 may have a shape corresponding to that of the outer surface of the crevice corrosion prevention member 110.

In the present embodiment, the body 120 has therein the rib 122 for supporting the crevice corrosion prevention member 110. However, the present invention is not limited thereto, and the body 120 may support the crevice corrosion prevention member 110 without a rib by using a structure thereof (e.g., a state in which an inner space of the body is filled with a material).

The body 120 may be made of a metal that is more active than the pipe 200. However, the body 120 may also be made of a non-metal material in consideration of a cost and a weight. For example, the body 120 may be made of a Teflon material is including Teflon, Teflon-containing composite synthetic resin, plastic, glass fiber, or the like.

The body 120 may include a first body 120a and a second body 120b which are assembled with the crevice corrosion prevention member 110 interposed therebetween. The first body 120a may be formed in a box shape with an open bottom to cover an upper portion of the crevice corrosion prevention member 110. The second body 120b may be formed in a box shape with an open top to cover a lower portion of the crevice corrosion prevention member 110. A first prevention member 110a may be inserted and fixed to the first body 120a. A second prevention member 110b may be inserted and fixed to the second body 120b.

In a state where the first body 120a and the second body 120b are arranged vertically with the crevice corrosion prevention member 110 interposed therebetween, the first body 120a and the second body 120b can be assembled as a single body 120 by fastening members 130 such as bolts or the like. At this time, the fastening members 130 can penetrate through holes 151 of a reinforcing plate 150 and be assembled to mounting holes 123 of the first body 120a and the second body 120b.

In the present embodiment, the body 120 includes the first body 120a and the second body 120b which are assembled to cover the upper portion and the lower portion of the crevice corrosion prevention member 110, respectively. However, the structure of the body 120 is not limited thereto, and the body 120 may be formed in a single box shape.

The crevice corrosion prevention member 110 is brought into direct contact with the outer surface of the pipe 200. The crevice corrosion prevention member 110 provided between the body 120 and the pipe 200 is corroded earlier than the pipe 200 and, thus, the crevice corrosion of the pipe 200 can be prevented.

This is because when two metals of different materials are brought into contact with each other in an environment where electrolyte such as rainwater or moisture its air exists, a potential is generated due to a potential difference between the two metals. At this time, a relatively more active metal serves as an anode and a relatively less active metal or a noble metal serves as a cathode. The anode loses electrons and is oxidized. Thus, the anode is corroded. The cathode receives electrons and is reduced. Thus, the cathode is protected from corrosion. Cathodic protection is a technique for protecting corrosion by using the above principle. The anode at this time is referred to as a "sacrificial anode". In the present embodiment, the pipe 200 serves as a cathode and the crevice corrosion prevention member 110 serves as a sacrificial anode. Since the crevice corrosion prevention member 110 is corroded earlier than the pipe 200, the pipe 200 can be protected from corrosion.

Here, an inner diameter H1 of the crevice corrosion prevention member 110 may be designed to be smaller than an inner diameter H2 of the opening hole 121a at least by a distance enough to prevent the crevice corrosion. For example, the distance between the inner diameter of the opening hole 121a and the outer diameter of the pipe 200 can be maintained at a level of about 100 microns or more. Accordingly, it is possible to prevent direct contact between the outer diameter surface of the pipe 200 and the inner diameter surface of the opening hole 121a. The inner diameter of the crevice corrosion prevention member 110 is designed to be the same as the outer diameter of the pipe 200. Therefore, the inner diameter surface of the clearance corrosion prevention member 110 and the outer diameter surface of the pipe 200 are brought into close contact with each other. Accordingly, it is possible to prevent occurrence of corrosion between the inner diameter surface of the crevice corrosion prevention member 110 and the outer diameter surface of the pipe 200.

The crevice corrosion prevention member 110 may include a first prevention member 110a to be in close contact with an upper outer surface of the pipe 200 and a second prevention member 110b to be in close contact with a lower outer surface of the pipe 200. The outer surfaces of the first prevention member 110a and the second prevention member 110b can be supported by the ribs 122 of the body 120. Both ends of the first prevention member 110a and the second prevention member 110b can be supported by the opening walls 121 of the body 120. Therefore, a length of the crevice corrosion prevention member 110 and a distance between the opening walls 121 can be designed to be the same.

Since the crevice corrosion prevention member 110 is supported in an outer diameter direction of the pipe 200 by the ribs 122 of the body 120, the inner surface of the crevice corrosion prevention member 110 can be brought into close contact with the outer surface of the pipe 200. Further, since the crevice corrosion prevention member 110 is supported in a longitudinal direction of the pipe 200 by the opening walls 121 of the body 120, the position of the crevice corrosion prevention member 110 in the body 120 can be fixed without an additional fixing device.

Figure 5:
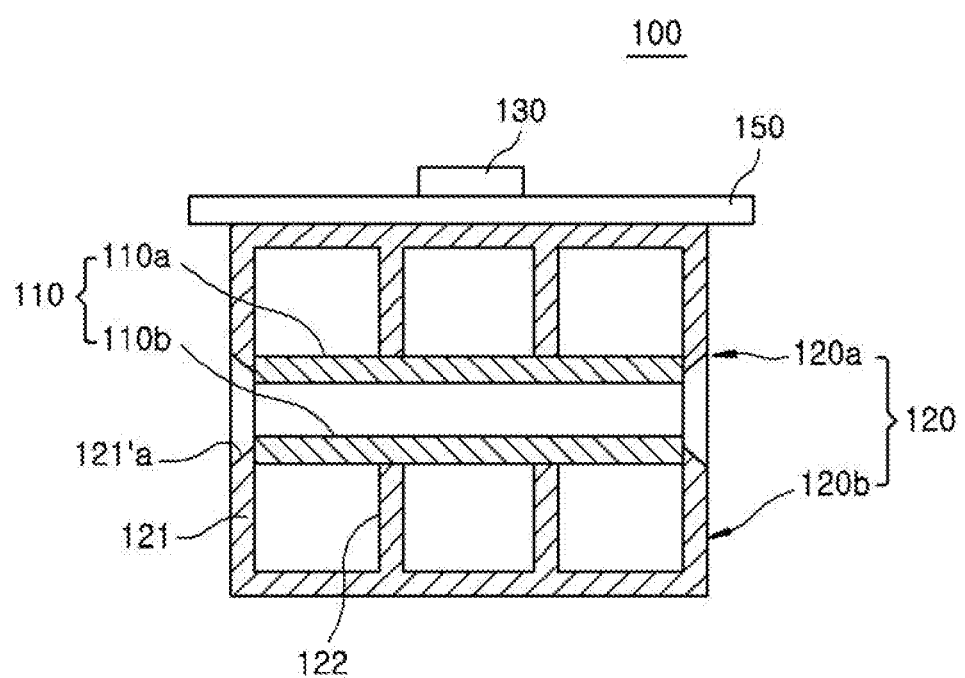
FIG. 5 is a cross sectional view of a clamp for a pipe according to a modification of the first embodiment.

FIG. 5 is a cross sectional view of a clamp for a pipe according to a modification of the first embodiment.

As shown in FIG. 5, in the modification of the first embodiment, an inclined surface inclined outwardly of the body 120 may be formed at an opening hole 121a' of the body 120.

The opening hole 121a' is formed to have an inner diameter surface in which an outside inner diameter is greater than an inside inner diameter. Accordingly, condensed water in the opening hole 121a' can be discharged to the outside of the body 120 along the inclined surface.

In the pipe facility 10 of the first embodiment, a coating layer 210 may be formed on an outer circumferential surface of the pipe 200 except a surface to be in contact with the crevice corrosion prevention member 110.

Referring back to FIG. 1, the coating layer 210 for preventing corrosion may by formed on the outer circumferential surface of the pipe 200, particularly on the outer circumferential surface of the pipe 200 except the surface to be in contact with the crevice corrosion prevention member 110. By coating the coating layer 210 in which transparent epoxy, urethane paint or the like is mixed with a corrosion resistant material such as rust resistant paint on the outer circumferential surface of the pipe 200 except the surface to be in contact with the crevice corrosion prevention member 110, it is possible to prevent corrosion products generated by the corrosion of the crevice corrosion prevention member 110 from being generated inside the clamp 100. As a result, the life time of the crevice corrosion prevention member 110 can be increased.

The coating layer 210 may be mixed with an indicator whose color is changed depending on pH concentration in addition to the corrosion resistant material. For example, when the outer circumferential surface of the pipe 200 is corroded, the number of hydrogen ions is increased at a portion where the corrosion occurs and, thus, the pH concentration is decreased. The number of OH ions is increased at the outer circumferential surface of the pipe 200 adjacent to a portion where the crevice corrosion occurs and, thus, the pH concentration is increased. Accordingly, in the case of forming the coating layer 210 mixed with the indicator on the outer circumferential surface of the pipe 200, the crevice corrosion can be detected from the coating layer 210 containing the indicator. This is because the corrosion always leads to changes in the PH concentration.

Here, the indicator mixed with the coating layer 210 may be an alkali detecting indicator whose color is changed when pH is shifted from neutral to alkaline. However, it is also possible to use an indicator having a color change range corresponding to the pH range of the material of the pipe 200.

is the same as that of the above-described clamp for a pipe and, thus, detailed description thereof will be omitted.

Hereinafter, the operation and the effect of the pipe facility according to the first embodiment will be described.

First, a pair of bodies 120 is made to face each other such that the crevice corrosion prevention member 110 surrounds the outer circumferential surface of the pipe 200. Next, the reinforcing plate 150 is provided on top of the body 120, and the fastening members 130 such as bolts or the like are inserted into the holes 151 of the reinforcing plate 150 and fastened to the plate that is the installation region 20. Accordingly, the installation operation of the clamp 100 is completed.

At this time, the outer surfaces of the first prevention member 110a and the second prevention member 110b can be supported by the ribs 122 of the body 120, and both ends of the first prevention member 110a and the second prevention member 110b are supported by the opening walls 121 of the body 120. Therefore, the position of the crevice corrosion prevention member 110 in the body 120 can be fixed without an additional fixing device.

Since the coating layer 210 for preventing corrosion is formed on the outer circumferential surface of the pipe 200 except the surface to be in contact with the crevice corrosion prevention member 110, it is possible to prevent corrosion products generated by the corrosion of the crevice corrosion prevention member 110 from being generated inside the clamp 110.

In accordance with the clamp for a pipe according to the second embodiment, the crevice corrosion prevention member may be made of an aluminum alloy having an oxide film on a surface thereof.

For example, a sacrificial aluminum electrode (Sacrificial Al Anode) applied to the crevice corrosion prevention member for preventing corrosion of the pipe is added with In, Zn, Sn or the like in order to prevent corrosion of a target metal (e.g., pipe). Accordingly, the function of the sacrificial electrode can be maintained. Here, the added components (In, Zn, Sn and the like) have a function of maximizing a corrosion prevention area of the target metal (pipe) in a corrosion environment and a function of continuously preventing corrosion by avoiding formation of an oxide film on the surface of the sacrificial aluminum electrode.

Table 1 shows comparison between components of an aluminum alloy having an oxide film on a surface thereof and those of a sacrificial aluminum electrode applied to the crevice corrosion prevention member for preventing corrosion of a pipe.

TABLE 1

|  | In | Ga | Zn | Si | Cu | Fr | Hg | Sn | Mn | Mg | Cr | Al |
|---|---|---|---|---|---|---|---|---|---|---|---|---|
| Sacrificial aluminum electrode | 0.014-0.020 | N/A | 4.0-6.5 | 0.08-0.20 | 0.004 max. | 0.09 max. | 0.001 max. | 0.001 max. |  |  |  | Remainder |
| Aluminum alloy (6061) | N/A | N/A | 0.25 max. | 0.8 max. | 0.4 max. | 0.7 max. |  |  | 0.15 max. | 1.2 max. | 0.35 max. |  |

The clamp 100 may include the crevice corrosion prevention member 110 surrounding the outer surface of the pipe 200 and the body 120 in which the ends of the crevice corrosion prevention member 110 are supported by the opening walls 121. Here, the configuration of the clamp 100

As for the components of the crevice corrosion prevention member applied to the present embodiment, it is possible to use an aluminum alloy having an oxide film on a surface thereof other than the components of the sacrificial aluminum electrode. This is because a clamp for preventing crevice corrosion is used for a high corrosion resistant pipe containing stainless steel, and the oxide film of the aluminum alloy is damaged not under a normal environment but under an environment where crevice corrosion of pipe occurs. Therefore, after the oxide film is damaged, the crevice corrosion of the pipe can be prevented by the aluminum alloy base material.

Figure 6:
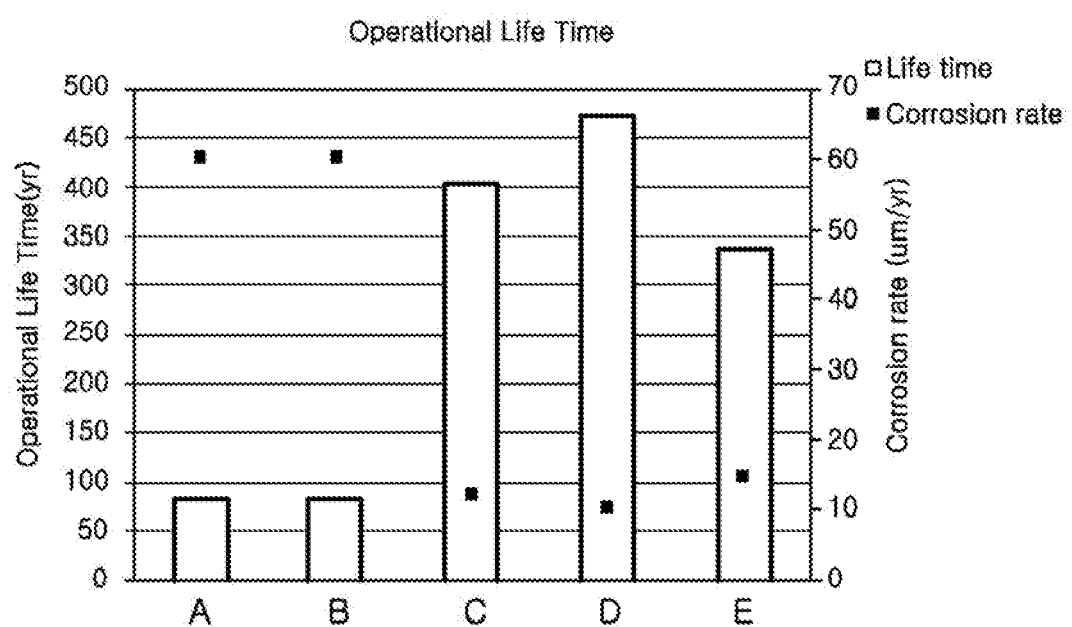
FIG. 6 is a graph for comparing an operational life time between a crevice corrosion preventing member made of an aluminum alloy having an oxide film on a surface thereof and a crevice corrosion preventing member having no oxide film on a surface thereof in a clamp for a pipe according to a second embodiment of the present invention.

FIG. 6 is a graph for comparing an operational life time between a crevice corrosion prevention member made of an aluminum alloy having an oxide film formed on a surface thereof and a crevice corrosion prevention member having no oxide film on a surface thereof in the clamp for a pipe according to the second embodiment.

As shown in FIG. 6, the operational life time of the crevice corrosion prevention member made of an aluminum alloy having an oxide film on a surface thereof (the present invention (C, D and E)) is longer than that of the crevice corrosion prevention member having no oxide film on a surface thereof (comparative example (A and B)) by eight times or more.

Here, A indicates a zinc sacrificial member (Zn anode); B indicates an aluminum sacrificial member (Al anode); C indicates an aluminum alloy (Al alloy: 2024); D indicates an aluminum alloy (Al alloy: 6061); and E indicates an aluminum alloy (Al alloy: 7075).

Figure 7:
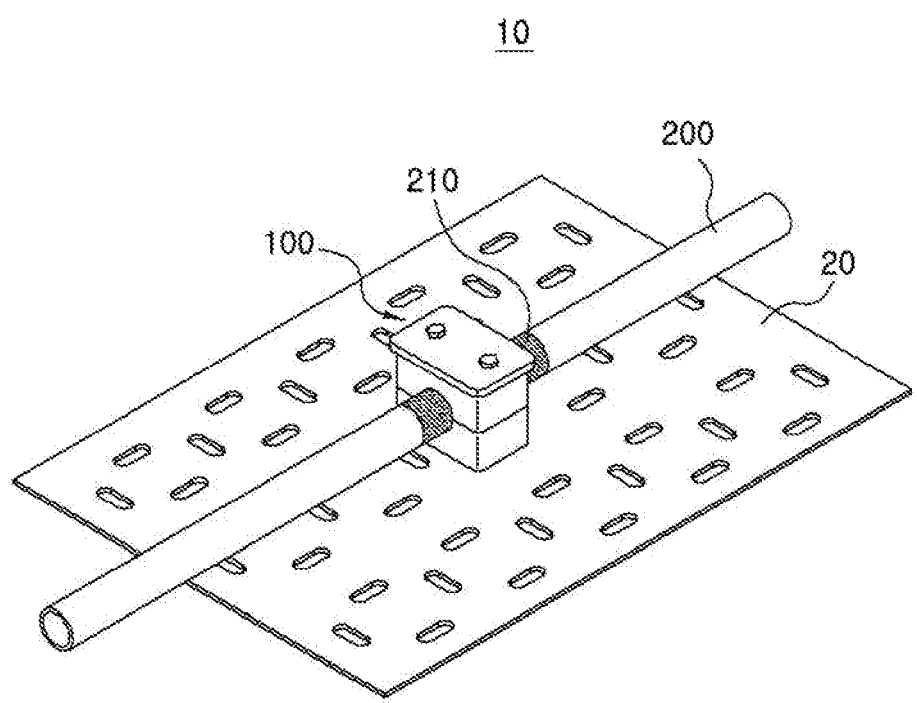
FIG. 7 is a perspective view of a pipe facility according to a third embodiment of the present invention.
Figure 8:
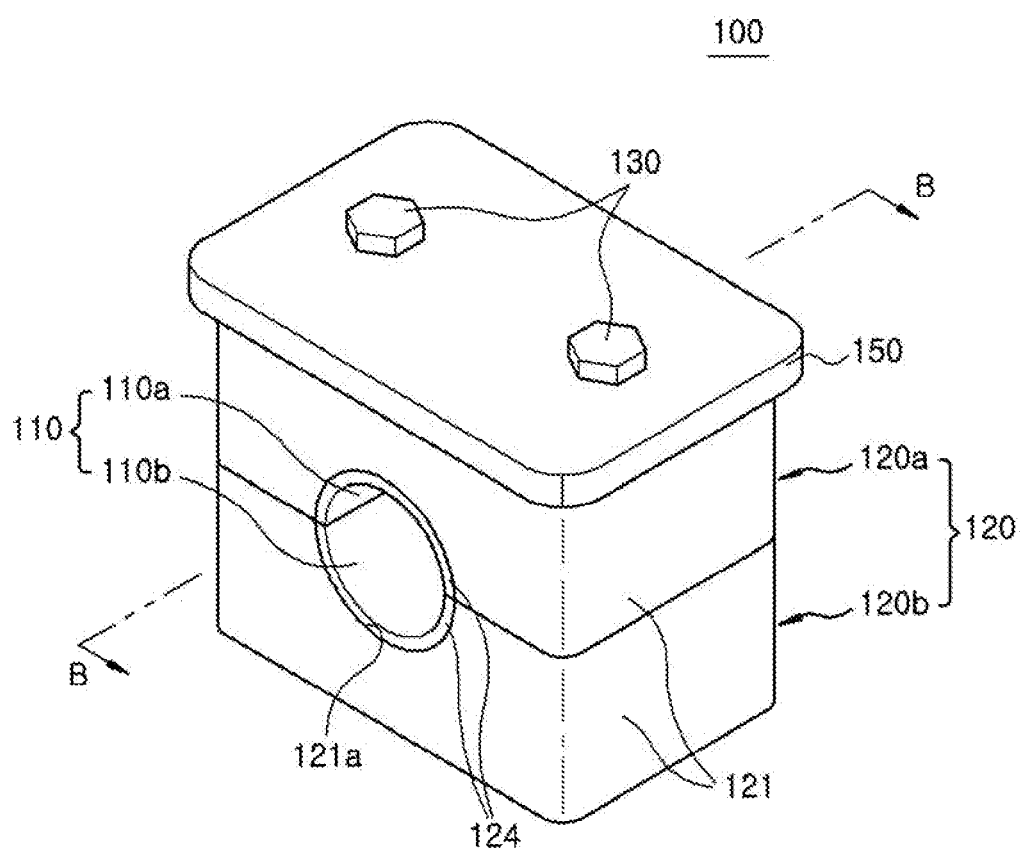
FIG. 8 is a perspective view of a clamp for a pipe according to the third embodiment.
Figure 9:
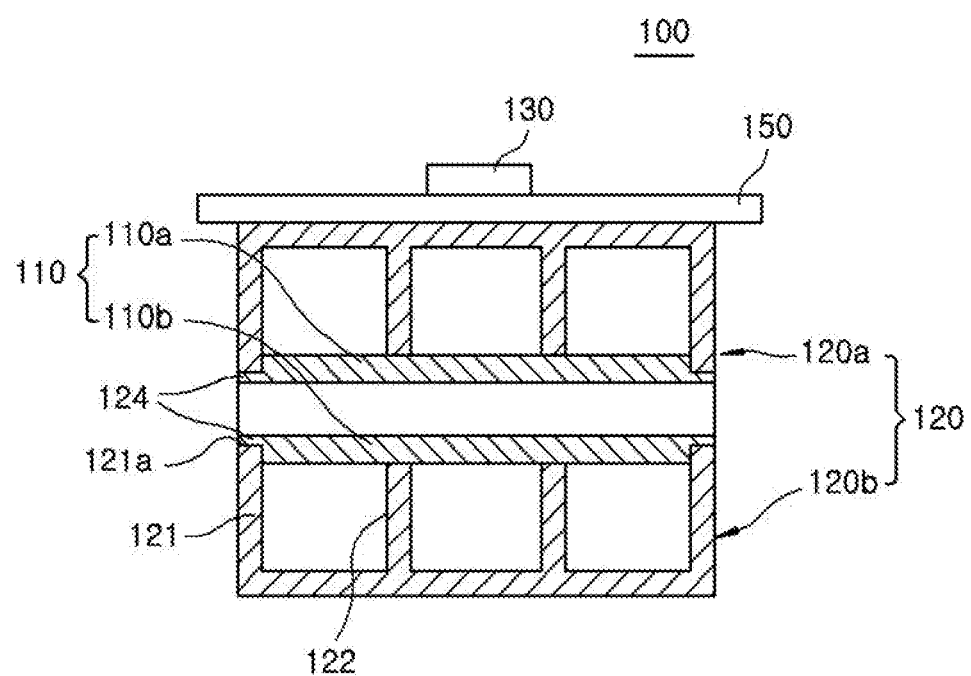
FIG. 9 is a cross sectional view taken along a line "B-B" in FIG. 8.
Figure 10:
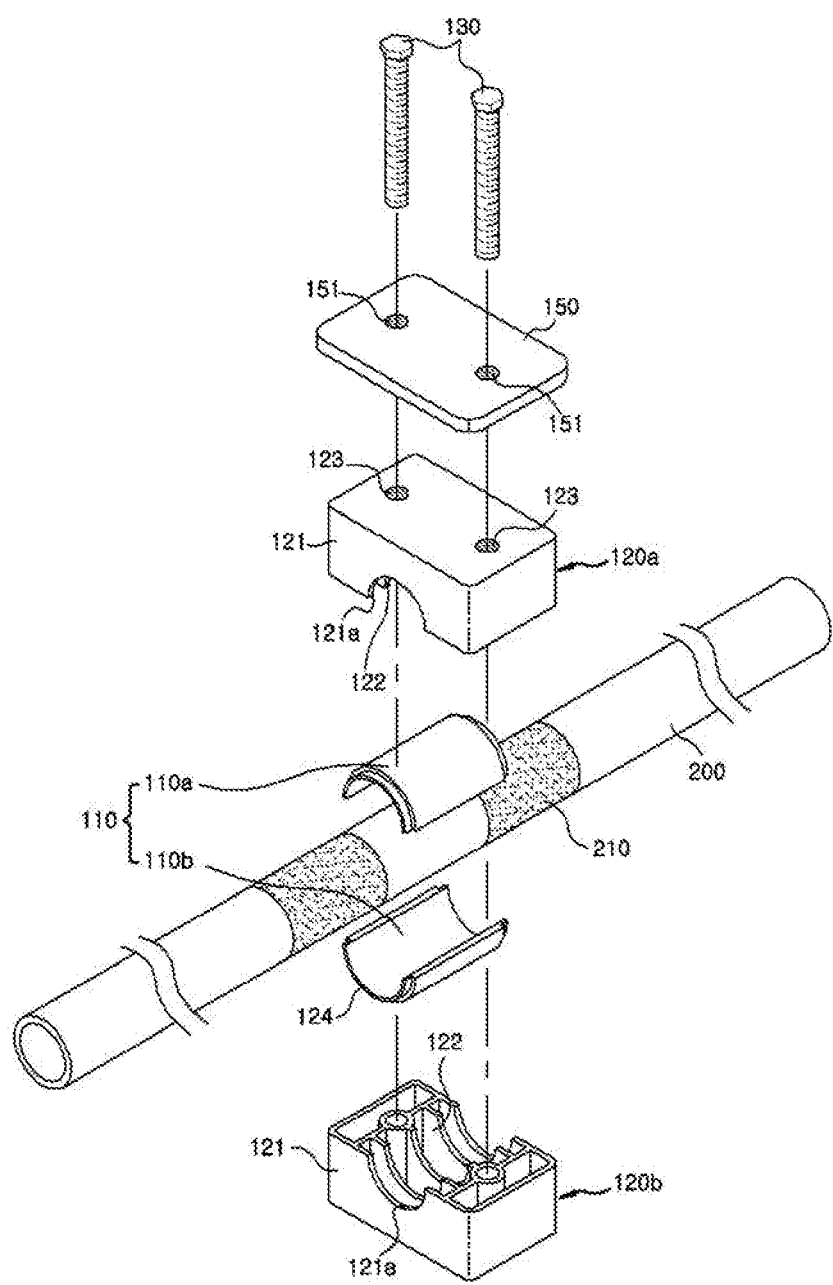
FIG. 10 is an exploded perspective view of the clamp for a pipe according to the third embodiment.

FIG. 7 is a perspective view of a pipe facility according to a third embodiment of the present invention. FIG. 8 is a perspective view of a clamp for a pipe according to the third embodiment. FIG. 9 is a cross sectional view taken along line "B-B" in FIG. 8. FIG. 10 is an exploded perspective view of the clamp for a pipe according to the third embodiment.

As shown in FIGS. 7 to 10, a clamp 100 for a pipe according to the third embodiment may include a crevice corrosion prevention member 110 surrounding an outer surface of a pipe 200 and a body 120 that is assembled to the crevice corrosion prevention member 110 such that stepped portions 124 of the crevice corrosion prevention member 110 can be supported.

Here, the pipe 200 is a pipe (or tube) used for long distance transfer of oil, gas or the like and made of stainless steel or various alloys having high corrosion resistance and high strength. The pipe 200 for transferring fluid may be formed in a longitudinal direction and may be fixed through the clamp 100 to an installation region 20 such as a plate or the like.

The body 120 can fix the pipe 200 to the installation region 20 or connect a plurality of pipes 200. The body 120 may be a hexahedral housing, and an opening wall 121 having an opening hole 121a may be provided at both end portions of the body 120. At this time, the opening hole 121a has a shape corresponding to that of an outer circumferential surface of the pipe 200. An inner diameter of the opening hole 121a is greater than an outer diameter of the pipe 200 at least by a distance enough to prevent generation of crevice corrosion. For example, the distance between the inner diameter of the opening hole 121a and the outer diameter of the pipe 200 can be maintained at a level of about 100 microns or more.

A rib 122 for supporting an outer surface of the crevice corrosion prevention member 110 may be provided inside the body 120. There may be provided one or more ribs 122. An end portion of the rib 122 may have a shape corresponding to that of the outer surface of the crevice corrosion prevention member 110.

In the present embodiment, the body 120 has therein the rib 122 for supporting the crevice corrosion prevention member 110. However, the present invention is not limited thereto, and the body 120 may support the crevice corrosion prevention member 110 without a rib by using a structure thereof (e.g., a state in which an inner space of the body is filled with a material).

The body 120 may be made of a metal that is more active than the pipe 200. However, the body 120 may also be made of a non-metal material in consideration of a cost and a weight. For example, the body 120 may be made of a Teflon material including Teflon, Teflon-containing composite synthetic resin, plastic, glass fiber, or the like.

The body 120 may include a first body 120a and a second body 120b which are assembled with the crevice corrosion prevention member 110 interposed therebetween. The first body 120a may be formed in a box shape with an open bottom to cover an upper portion of the crevice corrosion prevention member 110. The second body 120b may be formed in a box shape with an open top to cover a lower portion of the crevice corrosion prevention member 110. A first prevention member 110a may be inserted and fixed to the first body 120a. A second prevention member 110b may be inserted and fixed to the second body 120b.

In a state where the first body 120a and the second body 120b are arranged vertically with the crevice corrosion prevention member 110 interposed therebetween, the first body 120a and the second body 120b can be assembled as a single body 120 by fastening members 130 such as bolts or the like. At this time, the fastening members 130 can penetrate through holes 151 of a reinforcing plate 150 and be assembled to mounting holes 123 of the first body 120a and the second body 120b.

In the present embodiment, the body 120 includes the first body 120a and the second body 120b which are assembled to cover the upper portion and the lower portion of the crevice corrosion prevention member 110, respectively. However, the structure of the body 120 is not limited thereto, and the body 120 may be formed in a single box shape.

The crevice corrosion prevention member 110 is brought into direct contact with the outer surface of the pipe 200. The crevice corrosion prevention member 110 provided between the body 120 and the pipe 200 is corroded earlier than the pipe 200 and, thus, the crevice corrosion of the pipe 200 can be prevented. In the present embodiment, the pipe 200 serves as a cathode and the crevice corrosion prevention member 110 serves as a sacrificial anode. Since the crevice corrosion prevention member 110 is corroded earlier than the pipe 200, the pipe 200 can be protected from corrosion.

Here, an inner diameter of the crevice corrosion prevention member 110 may be designed to be greater than an outer diameter of the pipe 200 at least by a distance enough to prevent the crevice corrosion.

The crevice corrosion prevention member 110 may include a first prevention member 110a to be in close contact with an upper outer surface of the pipe 200 and a second prevention member 110b to be in close contact with a lower outer surface of the pipe 200. The outer surfaces of the first prevention member 110a and the second prevention member 110b can be supported by the ribs 122 of the body 120, and both ends of the first prevention member 110a and the second prevention member 110b can be supported at the opening hole 121a of the opening wall 121 by the stepped portions 124.

Since the crevice corrosion prevention member 110 is supported in an outer diameter direction of the pipe 200 by the ribs 122 of the body 120, the inner surface of the crevice corrosion prevention member 110 can be brought into close contact with the outer surface of the pipe 200. Further, since the crevice corrosion prevention member 110 is supported at the opening hole 121a of the body 120 by the stepped portions 124, the position of the crevice corrosion prevention member 110 in the body 120 can be fixed without an additional fixing device.

Particularly, under an environment where the crevice corrosion of the pipe 200 occurs, the stepped portions 124 of the crevice corrosion prevention member 110 are corroded earlier than other portions of the crevice corrosion prevention member 110 than the stepped portions 124. Accordingly, no gap is generated between the pipe 200 and the body 120 and, thus, the crevice corrosion caused by the gap can be prevented. Further, the pipe 200 is effectively supported by the body 120 and, thus, the supporting force can be maintained.

Figure 11:
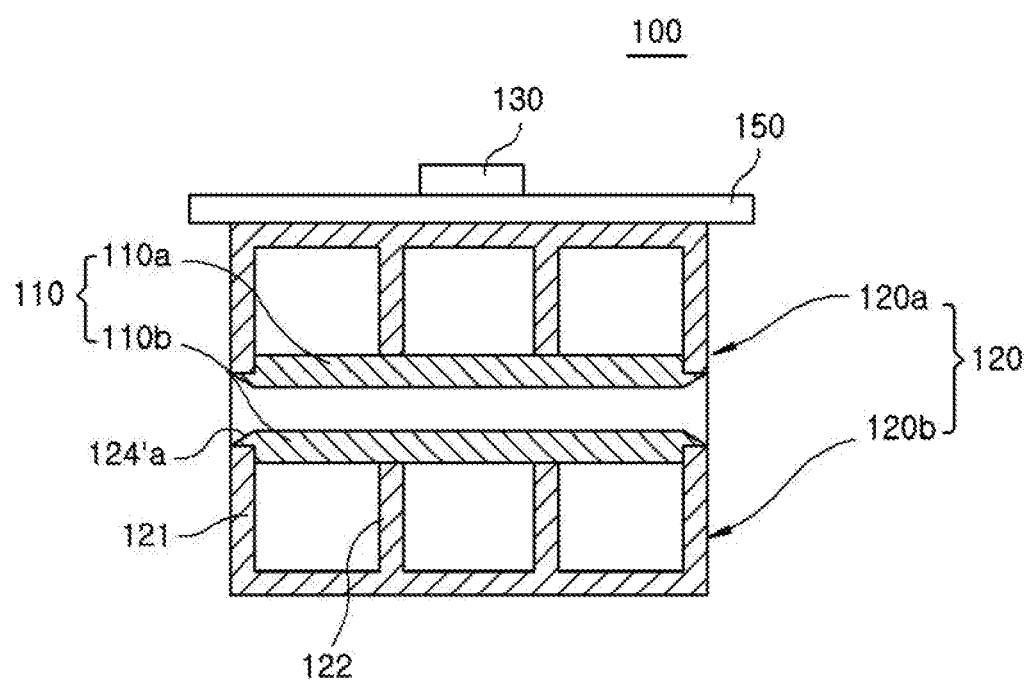
FIG. 11 is a cross sectional view of a clamp for a pipe according to a modification of the third embodiment.

FIG. 11 is a cross sectional view of a clamp for a pipe according to a modification of the third embodiment.

As shown in FIG. 11, in the modification of the third embodiment, an inclined surface inclined outwardly of the body 120 may be formed at a stepped portion 124a' of the crevice corrosion prevention member 110.

The stepped portion 124a' is configured as an inner diameter surface in which an outside inner diameter is greater than an inside inner diameter. Accordingly, condensed water in the stepped portion 124a' can be discharged to the outside of the body 120 along the inclined surface.

In the pipe facility 10 of the third embodiment, a coating layer 210 may be formed on an outer circumferential surface of the pipe 200 except a surface to be in contact with the crevice corrosion prevention member 110.

Referring back to FIG. 7, the coating layer 210 for preventing corrosion may by formed on the outer circumferential surface of the pipe 200, particularly on the outer circumferential surface of the pipe 200 except the surface to be in contact with the crevice corrosion prevention member 110. By coating the coating layer 210 in which transparent epoxy, urethane paint or the like is mixed with a corrosion resistant material such as rust resistant paint on the outer circumferential surface of the pipe 200 except the surface to be in contact with the crevice corrosion prevention member 110, it is possible to prevent corrosion products generated by the corrosion of the crevice corrosion prevention member 110 from being generated inside the clamp 100. As a result, the life time of the crevice corrosion prevention member 110 can be increased.

The coating layer 210 may be mixed with an indicator whose color is changed depending on pH concentration in addition to the corrosion resistant material. For example, when the crevice corrosion occurs at the outer circumferential surface of the pipe 200 which is brought into contact with the clamp 100, the number of hydrogen ions is increased at a portion where the corrosion occurs and, thus, the pH concentration is decreased. The number of OH ions is increased at the outer circumferential surface of the pipe 200 adjacent to a portion where the crevice corrosion occurs and, thus, the pH concentration is increased. Accordingly, in the case of forming the coating layer 210 mixed with the indicator on the outer circumferential surface of the pipe 200, the crevice corrosion can be detected from the coating layer 210 containing the indicator. This is because the crevice corrosion always leads to changes in the PH concentration.

Here, the indicator mixed with the coating layer 210 may be an alkali detecting indicator whose color is changed when pH is shifted from neutral to alkaline. However, it is also possible to use an indicator having a color change range corresponding to the pH range of the material of the pipe 200.

The clamp 100 may include the crevice corrosion prevention member 110 surrounding the outer surface of the pipe 200 and the body 120 in which the ends of the crevice corrosion prevention member 110 are supported by the opening walls 121. Here, the configuration of the clamp 100 is the same as that of the above-described clamp for a pipe and, thus, detailed description thereof will be omitted.

Hereinafter, the operation and the effect of the pipe facility according to the third embodiment will be described.

First, a pair of bodies 120 is made to face each other such that the crevice corrosion prevention member 110 surrounds the outer circumferential surface of the pipe 200. Next, the reinforcing plate 150 is provided on top of the body 120, and the fastening members 130 such as bolts or the like are inserted into the holes 151 of the reinforcing plate 150 and fastened to the plate that is the installation region 20. Accordingly, the installation operation of the clamp 100 is completed.

At this time, the outer surfaces of the first prevention member 110a and the second prevention member 110b can be supported by the ribs 122 of the body 120, and both ends of the first prevention member 110a and the second prevention member 110b are supported at the opening hole 121a by the stepped portions 124. Therefore, the position of the crevice corrosion prevention member 110 in the body 120 can be fixed without an additional fixing device.

Since the coating layer 210 for preventing corrosion is formed on the outer circumferential surface of the pipe 200 except the surface to be in contact with the crevice corrosion prevention member 110, it is possible to prevent corrosion products generated by the corrosion of the crevice corrosion prevention member 110 from being generated inside the clamp 110.

Figure 12:
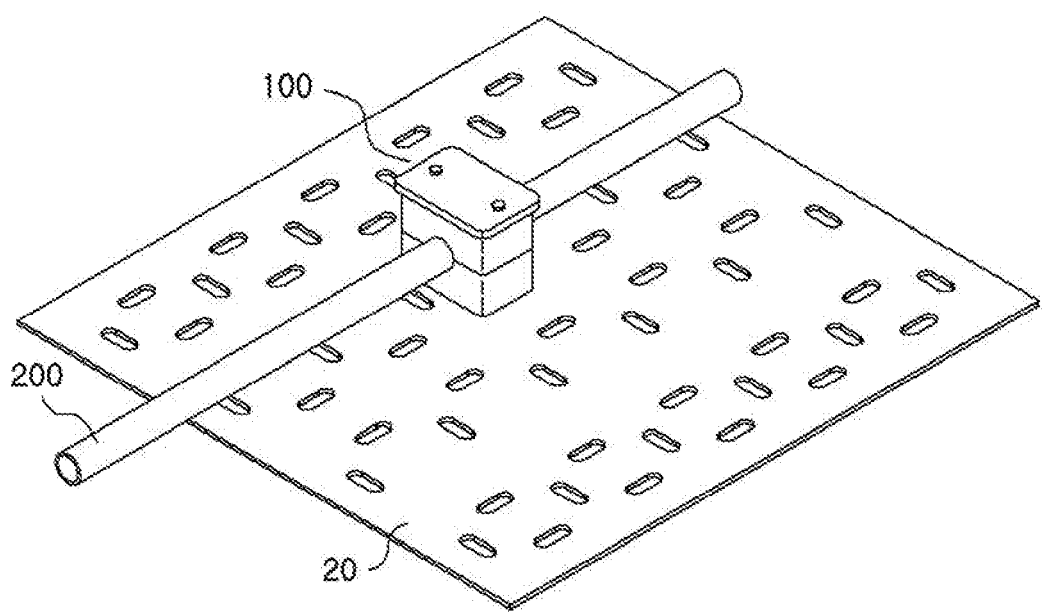
FIG. 12 is a perspective view of a pipe facility including a clamp for a pipe according to a fourth embodiment of the present invention.

Hereinafter, a pipe facility 10 in which a pipe 200 is fixed to an installation region 20 by a clamp 100 for a pipe according to a fourth embodiment of the present invention will be described with reference to FIG. 12. FIG. 12 is a perspective view of the pipe facility including the clamp for a pipe according to the fourth embodiment.

Referring to FIG. 12, the pipe facility 10 according to the fourth embodiment includes the clamp 100 for a pipe that can be installed at the installation region 20 such as a plate or the like and is connected to the pipe 200. The clamp 100 for a pipe may be made of a material including Teflon, Teflon-containing composite synthetic resin, plastic, glass fiber, or the like, in consideration of a cost.

The pipe 200 is installed at the installation region 20 by the clamp 100 for a pipe, and a plurality of pipes 200 can be connected by the clamp 100 for a pipe. The pipe 200 provides a conduit for long distance transfer of fluid such as oil, gas or the like, and is made of stainless steel having high corrosion resistance and high strength or corrosion resistance alloy.

A crevice corrosion prevention member may be provided between the clamp 100 for a pipe and the pipe 200.

Hereinafter, a specific configuration of the clamp 100 for a pipe including the crevice corrosion prevention member will be described with reference to FIGS. 13 to 16.

Figure 13:
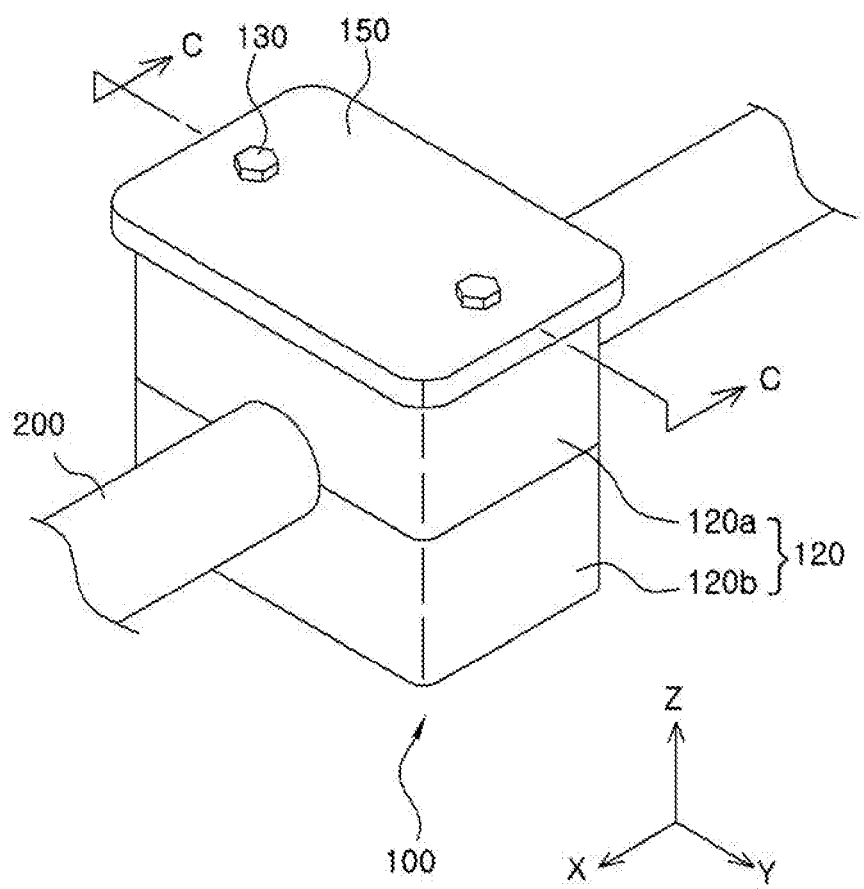
FIG. 13 is an enlarged view of the clamp for a pipe shown in FIG. 12.
Figure 14:
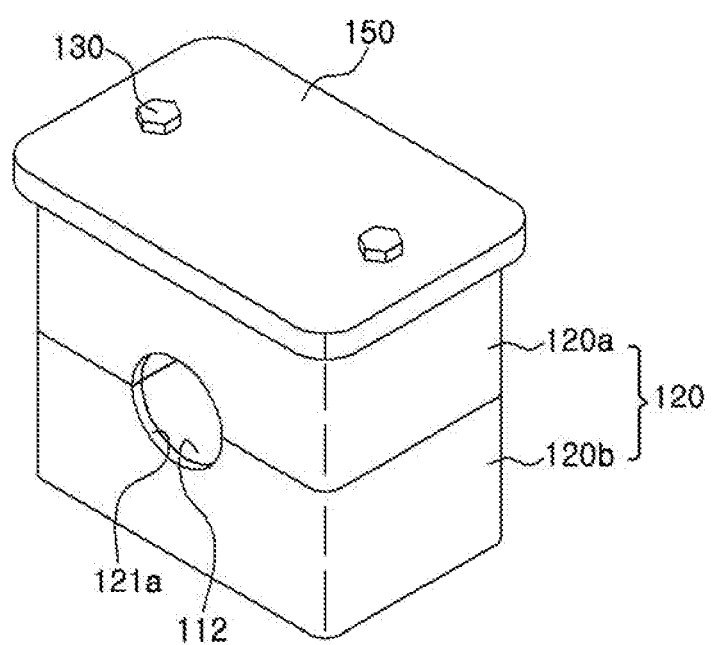
FIG. 14 is a perspective view showing a state in which the clamp for a pipe shown in FIG. 13 is fastened without a pipe.
Figure 15:
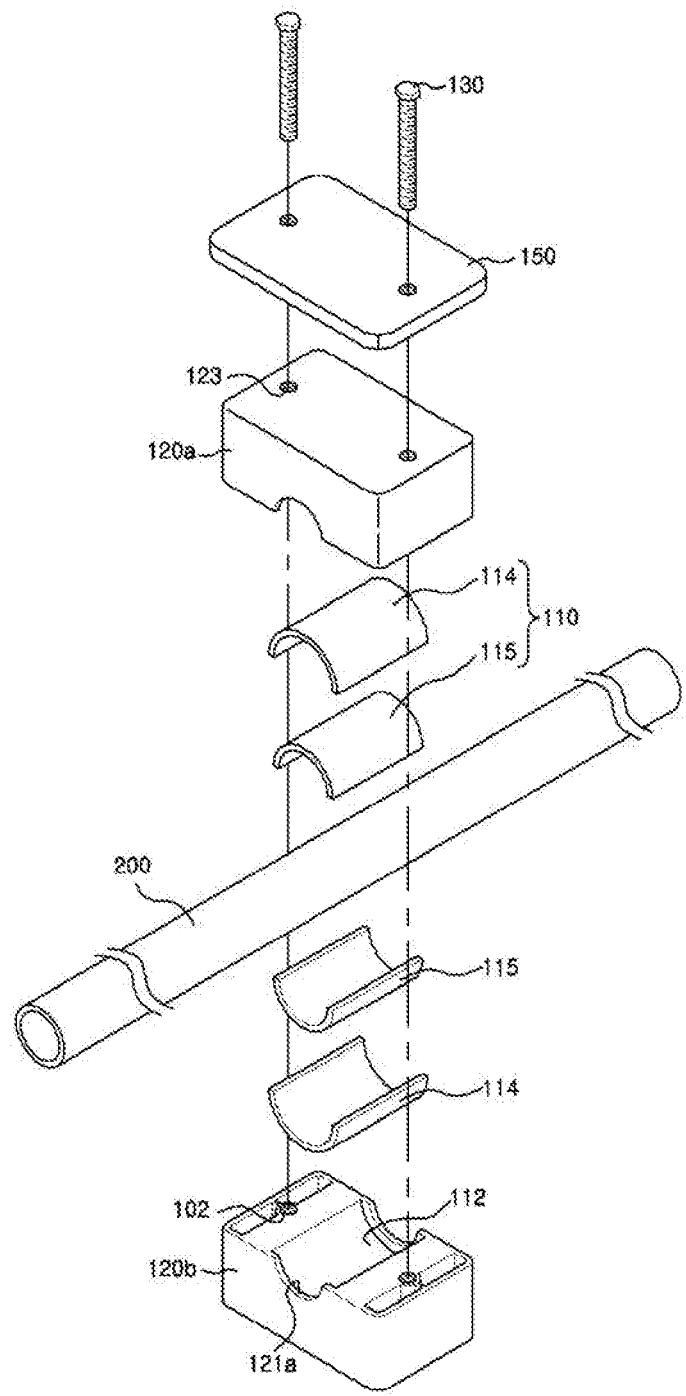
FIG. 15 is an exploded perspective view of the clamp for a pipe shown in FIG. 13.
Figure 16:
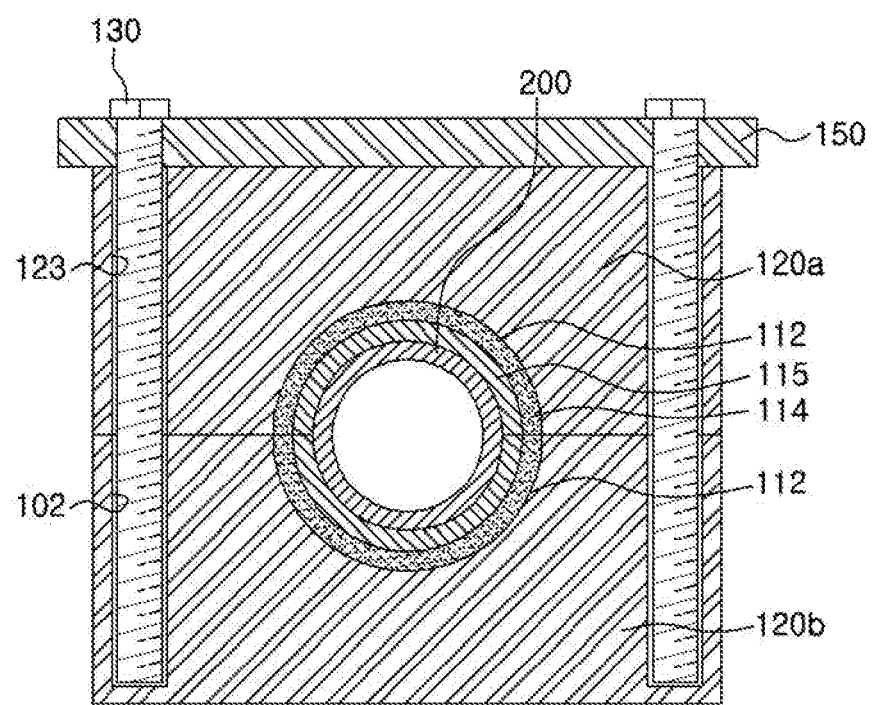
FIG. 16 is a cross sectional view taken along a line "C-C" in FIG. 13.

FIG. 13 is an enlarged view of the clamp for a pipe shown in FIG. 12. FIG. 14 is a perspective view showing a state in which the clamp for a pipe shown in FIG. 13 is fastened without a pipe. FIG. 15 is an exploded perspective view of the clamp for a pipe shown in FIG. 13. FIG. 16 is a cross sectional view taken along a line "C-C" in FIG. 13.

Referring to FIGS. 13 to 16, the clamp 100 for a pipe can fix the pipe 200 to the installation region 20 while being in surface contact with the circumferential surface of the pipe 200, or can connect a plurality of pipes 200. The clamp 100 for a pipe may include a pair of bodies 120a and 120b and fastening members 130 for connecting the pair of bodies 120a and 120b. At this time, the first body 120a may be provided at an upper portion of the pipe 200 and the second body 120b may be provided at a lower portion of the pipe 200.

The first body 120a of the pipe 200 may have a shape covering an upper circumferential surface of the pipe 200. At this time, the first body 120a may have a hexahedral shape. One or more mounting holes 123 into which the fastening members 130 can be inserted may be formed on an upper surface of the first body 120a. In addition, a semicircular opening hole 121a into which the pipe 200 is inserted may be formed on one surface and the other surface of the first body 120a.

A supporting portion 112 capable of supporting the crevice corrosion prevention member 110 may be formed at the first body 120a. The supporting portion 112 may have a shape corresponding to the outer circumferential surface of the crevice corrosion prevention member 110, and the crevice corrosion prevention member may be mounted on the supporting portion 112. Further, the supporting portion 112 is depressed inward compared to the semicircular opening hole 121a and thus may have a radius greater than that of the semicircular opening hole 121a. Here, the "outer circumferential surface" of the crevice corrosion prevention member indicates a surface opposite to the surface where the crevice corrosion prevention member is brought into contact with the pipe.

The second body 120b may have a shape covering the lower circumferential surface of the pipe 200. The specific configuration of the second body 120b is the same as that of the first body 120a.

The above bodies 120a and 120b are merely examples and, thus, the idea of the present invention is not limited by the shape of these bodies. The bodies 120a and 120b of the clamp can be variously modified as long as the idea of the present invention is not impaired.

It is also possible to clamp the pipe 200 by arranging the first body 210 and the second body 120b vertically with the pipe 200 interposed therebetween and then fastening fastening members 130 such as bolts or the like to mounting holes 123 of the first body 120a and insertion holes 102 of the second body 20b. At this time, a reinforcing plate 150 may be provided between the first body 120a and the fastening member 130.

The crevice corrosion prevention member 110 may be provided between the bodies 120a and 120b and the pipe 200 when viewed from a cross section in an axial direction of the pipe 200 (FIG. 16). Here, the axial direction of the pipe 200 indicates the X-axis direction in FIG. 13.

Further, the crevice corrosion prevention member 110 may include a rust preventing portion 115 surrounding a part of or all of the circumferential surface of the pipe 200, and an outer circumference protecting portion 114 surrounding an outer circumferential surface of the rust preventing portion 115. Here, the "outer circumferential surface" of the rust preventing portion indicates a surface opposite to the surface where the rust preventing portion is brought into contact with the pipe, as in the case of the outer circumferential surface of the crevice corrosion prevention member.

The rust preventing portion 115 may contain a metal having higher reactivity than that of the pipe 200. For example, the rust preventing portion 115 may be made of aluminum (Al), alloy in which aluminum (Al) is mixed with tin (Sn), phosphorus (In) or the like, zinc (Zn), zinc alloy, or the like. The type of the rust preventing portion 115 is not limited thereto, and it is also possible to use a metal material that is highly corrosive compared to the pipe.

The outer circumference protecting portion 114 may have a length shorter than those of the bodies 120a and 120b, and thus can be prevented from being exposed to the outside of the bodies 120a and 120b. Here, the "length" indicates a length in the axial direction of the pipe 200, i.e., the X-axis direction in FIG. 13. The "length" described in the specification and the claims of the present invention indicate the length in the X-axis direction, unless otherwise specified.

The outer circumference protecting portion 114 may surround the entire outer circumferential surface of the rust preventing portion 115. Further, the outer circumference protecting portion 114 may have a length longer than that of the rust preventing portion 115. Accordingly, the outer circumference protecting portion 114 surrounds the rust preventing portion 115 along the axial direction of the pipe 200 (X direction). The outer circumference protecting portion 114 and the rust protecting portion 115 may be bonded to each other by an adhesive device such as an adhesive or the like.

The outer circumference protecting portion 114 may be made of a material such as Teflon, Teflon-containing composite synthetic resin, plastic, high strength polyethylene, para-aromatic polyamide, glass fiber, or the like.

In the drawings related to the present embodiment, the rust preventing portion 115 and the outer circumference protecting portion 114 are illustrated as members having predetermined thicknesses. However, it is merely an example, and it is also possible to use a considerably thin film, a considerably thin foil, a material that can be taped, or the like.

Hereinafter, the operation and the effect of the clamp for a pipe which is configured as described above will be described.

In the clamp 100 for a pipe according to the embodiment of the present invention, the rust preventing portion 115 of the crevice corrosion prevention member 110 serves as a sacrificial anode and, thus, the corrosion of the pipe 200 can be minimized.

The outer circumference protecting portion 114 minimizes exposure of the outer circumferential surface of the rust preventing portion 115 to water, air, or the like inside the body. Therefore, natural erosion of the rust preventing portion 115 can be reduced and the function of the sacrificial anode can be maintained for a longer period of time. In other words, due to the presence of the outer circumference protecting portion 114, the life time of the rust preventing portion 115 is increased compared to that in a conventional case.

Further, the outer circumference protecting portion 114 can improve tension of the rust preventing portion 115 and reduce damages. Especially, when the rust preventing portion 115 is a considerably thin film, a considerably thin foil, or the like, it is easily damaged due to a low tensile strength/yield strength of about several hundreds of Mpa. Since, however, the outer circumference protecting portion 114 has a high tensile strength/yield strength of several tens to several hundreds of GPa, the damage of the rust preventing portion 115 can be minimized due to the presence of the outer circumference protecting portion 114.

In the present embodiment and the drawings related thereto, the crevice corrosion prevention member 110 and the rust preventing portion 115 are provided as two separate members, i.e., an upper member and a lower member. However, it is merely an example, and the crevice corrosion prevention member 110 and the rust preventing portion 115 may be provided as a single member. In other words, the crevice corrosion prevention member 110 and the rust preventing portion 115 formed as separate members may be taped to surround the outer circumferential surface, and a taping start portion and a taping end portion may be bonded to each other by an adhesive or the like.

Although it is illustrated that the entire outer circumferential surface of the crevice corrosion prevention member 110 is brought into contact with the supporting portion 112, the idea of the present invention is not limited thereto. For example, only part of the outer circumferential surface of the crevice corrosion prevention member 110 may be brought into contact with the supporting portion 112 by forming a groove or a recess depressed from a surface of the supporting portion 112 which is brought into contact with the pipe 200.

In addition to the above-described configuration, in a modification of the fourth embodiment of the present invention, the crevice corrosion prevention member 110 may have a finishing protecting portion 116 surrounding the circumferential surface of the pipe 200.

Figure 17:
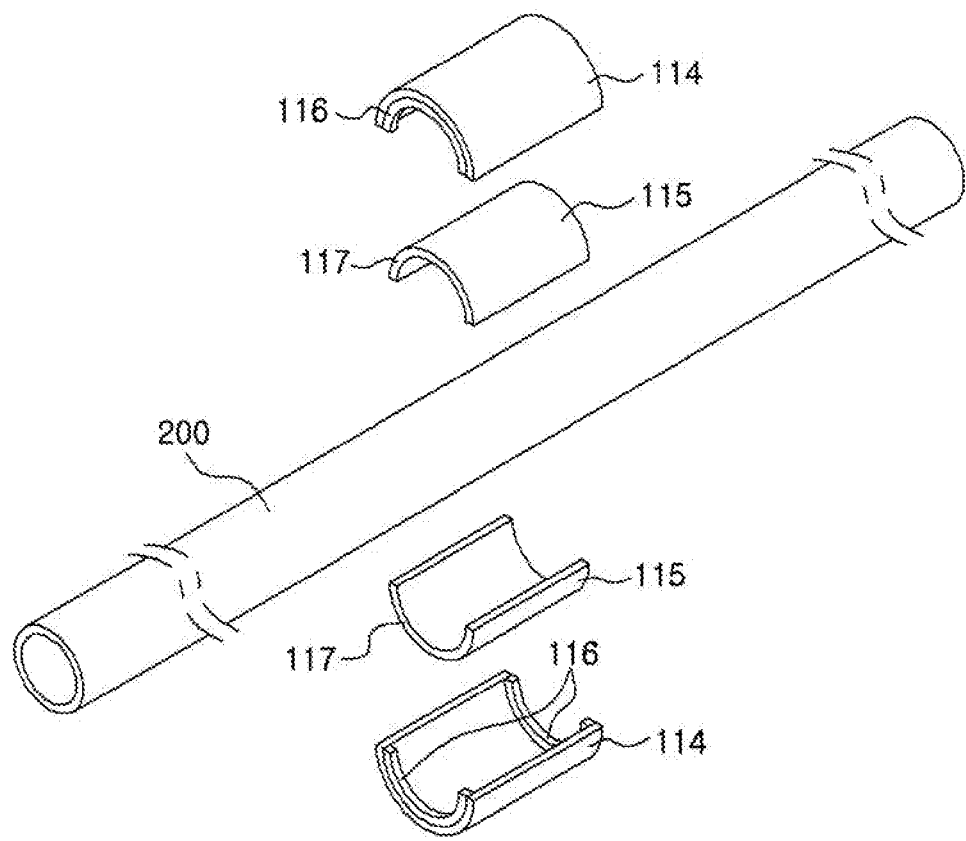
FIG. 17 is an exploded perspective view of a crevice corrosion prevention member according to a modification of the fourth embodiment.
Figure 18:
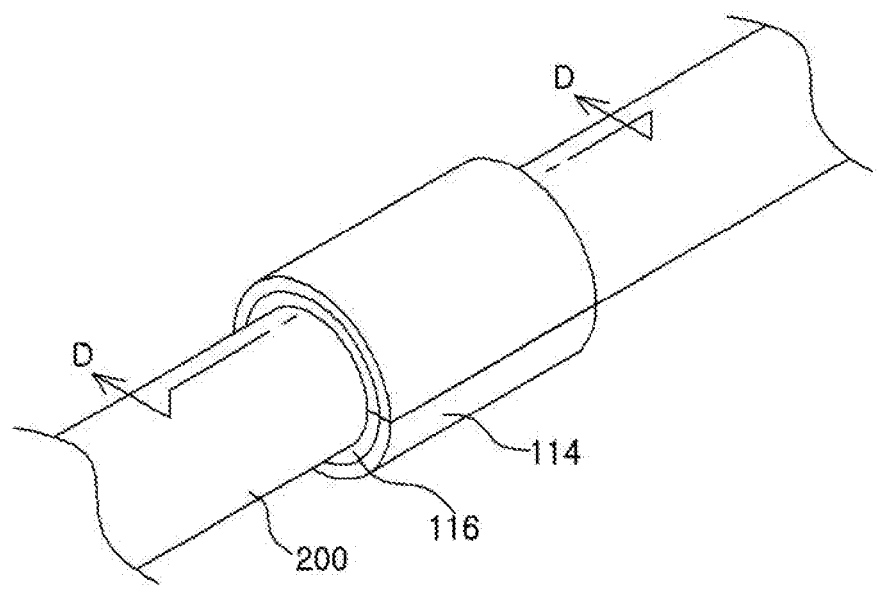
FIG. 18 is a perspective view showing an assembled state of the crevice corrosion prevention member shown in FIG. 17.
Figure 19:
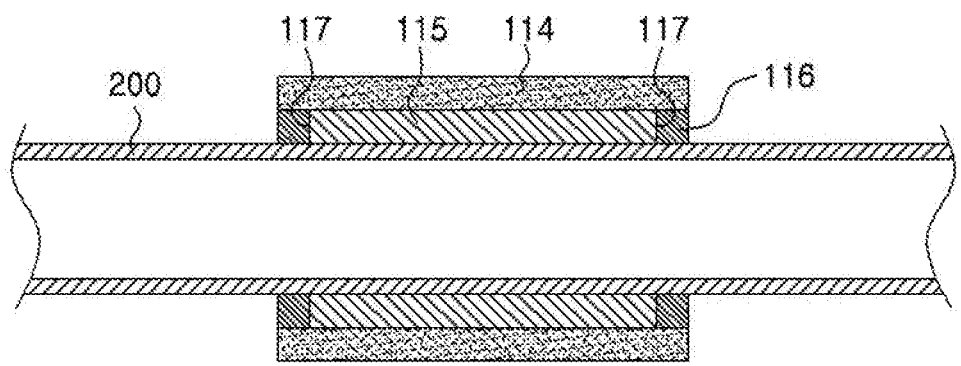
FIG. 19 is a cross sectional view taken along line "D-D" in FIG. 18.

Hereinafter, the modification of the fourth embodiment will be described with reference to FIGS. 17 to 19. FIG. 17 is an exploded perspective view of a crevice corrosion prevention member according to a modification of the fourth embodiment. FIG. 18 is a perspective view showing an assembled state of the crevice corrosion prevention member shown in FIG. 17. FIG. 19 is a cross sectional view taken along a line "D-D" in FIG. 18.

In describing the modification of the fourth embodiment of the present invention, the differences between the modification of the fourth embodiment and the above-described embodiments will be mainly described, and the above-described embodiments will be incorporated for the same description and like reference numerals.

Referring to FIGS. 17 to 19, the crevice corrosion prevention member 110 according to the modification of the fourth embodiment further includes the finishing protecting portion 116.

The finishing protecting portion 116 may be formed such that an inner circumferential surface thereof surrounds the circumferential surface of the pipe 200 and an outer circumferential surface thereof is surrounded by the inner circumferential surface of the outer circumference protecting portion 114. Further, the finishing protecting portion 116 is provided at one end portion and the other end portion of the rust preventing portion 115 in the axial direction of the pipe 200 (X-axis direction). Here, the "inner circumferential surface" indicates a surface facing the circumferential surface of the pipe (facing surface).

The finishing protecting portion 116 can be connected to the outer circumference protecting portion 114 by an adhesion unit such as an adhesive or the like. At this time, the inner circumferential surface of the outer circumference protecting portion 114 and the outer circumferential surface of the finishing protecting portion 116 can be brought into close contact with each other. Further, the outer circumference protecting portion 114 and the finishing protecting portion 116 can be formed as one unit. Accordingly, it is possible to prevent water, air, or the like from flowing into the gap between the outer circumference protecting portion 114 and the finishing protecting portion 116.

In the crevice corrosion prevention member of the present embodiment, an extension surface 117 of the rust preventing portion can be prevented from being exposed to water, air, or the like inside the body. Here, the extension surface 117 of the rust preventing portion indicates a surface perpendicular to the pipe extension direction (X-axis direction). Accordingly, the exposed area of the rust preventing portion 115 is further reduced and, thus, the life time of the rust preventing portion 115 can be further increased.

Figure 20:
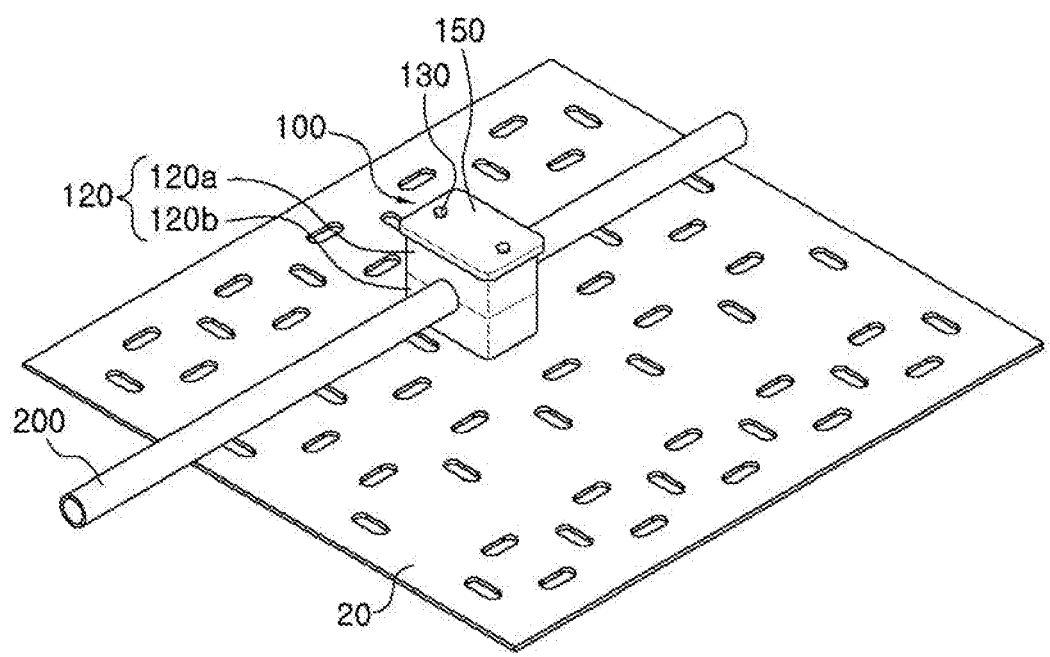
FIG. 20 is a schematic perspective view of a pipe coupled to a clamp for a pipe according to a fifth embodiment of the present invention.
Figure 21:
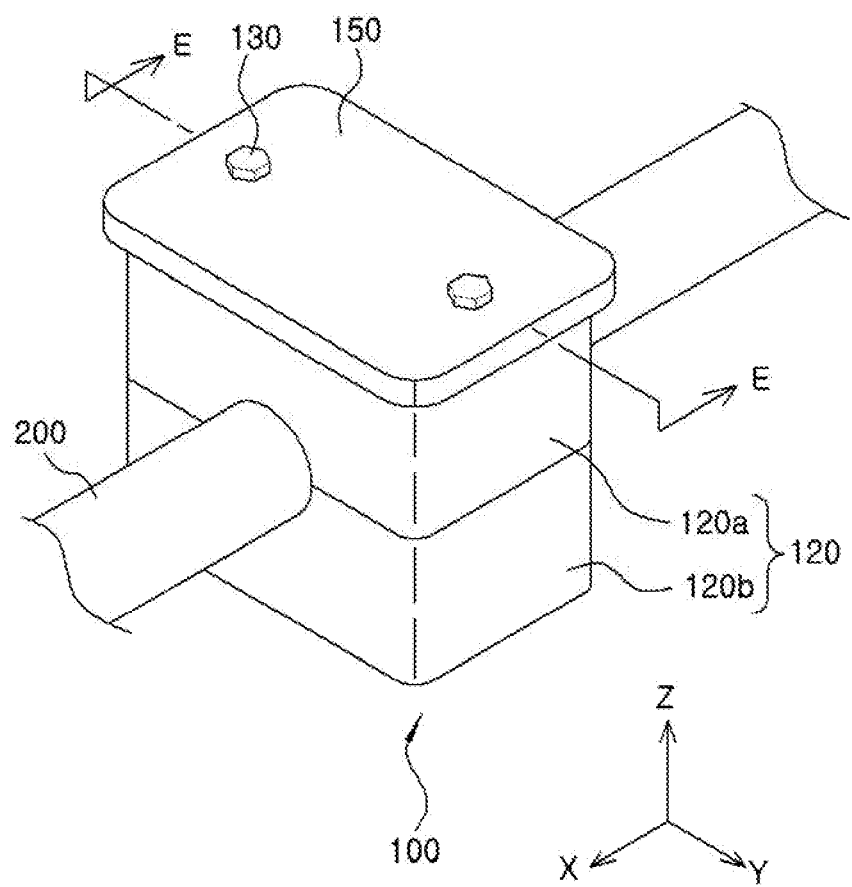
FIG. 21 is an enlarged view of the clamp for a pipe according to the fifth embodiment.
Figure 22:
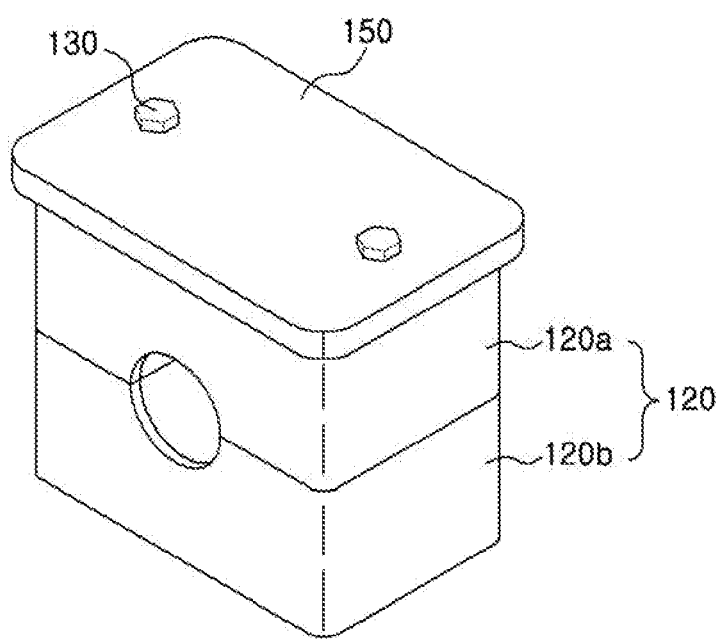
FIG. 22 is a schematic perspective view of the clamp for a pipe according to the fifth embodiment.
Figure 23:
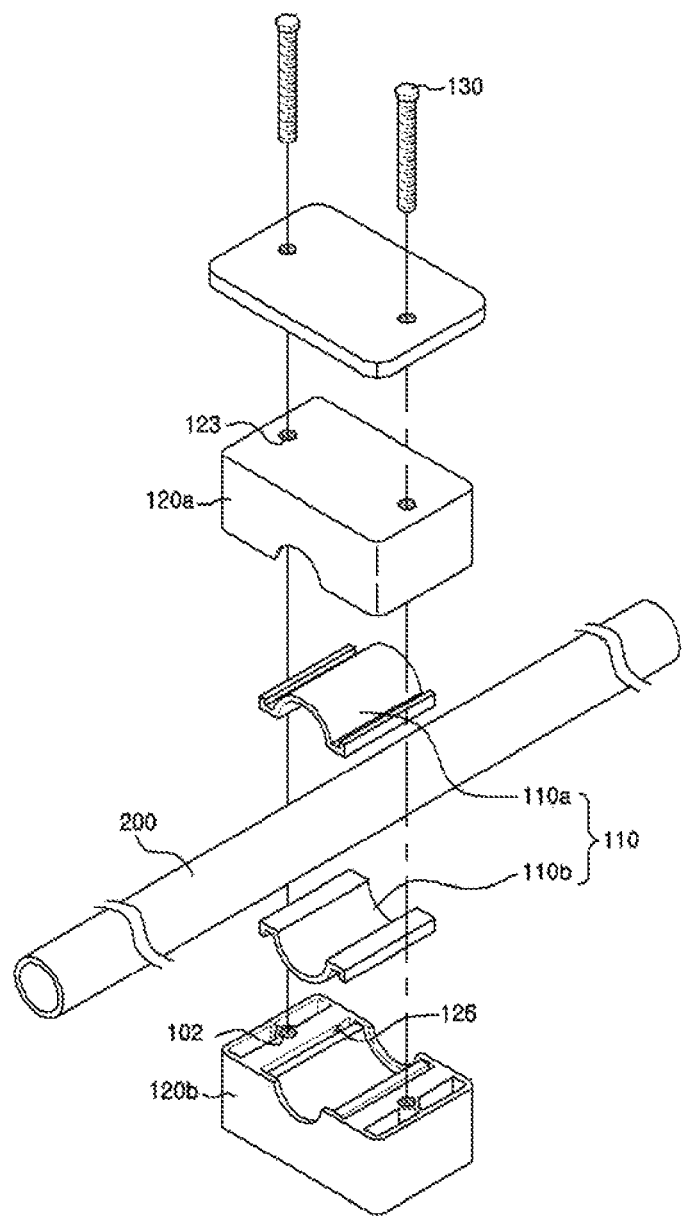
FIG. 23 is a schematic exploded perspective view of the clamp for a pipe according to the fifth embodiment.
Figure 24:
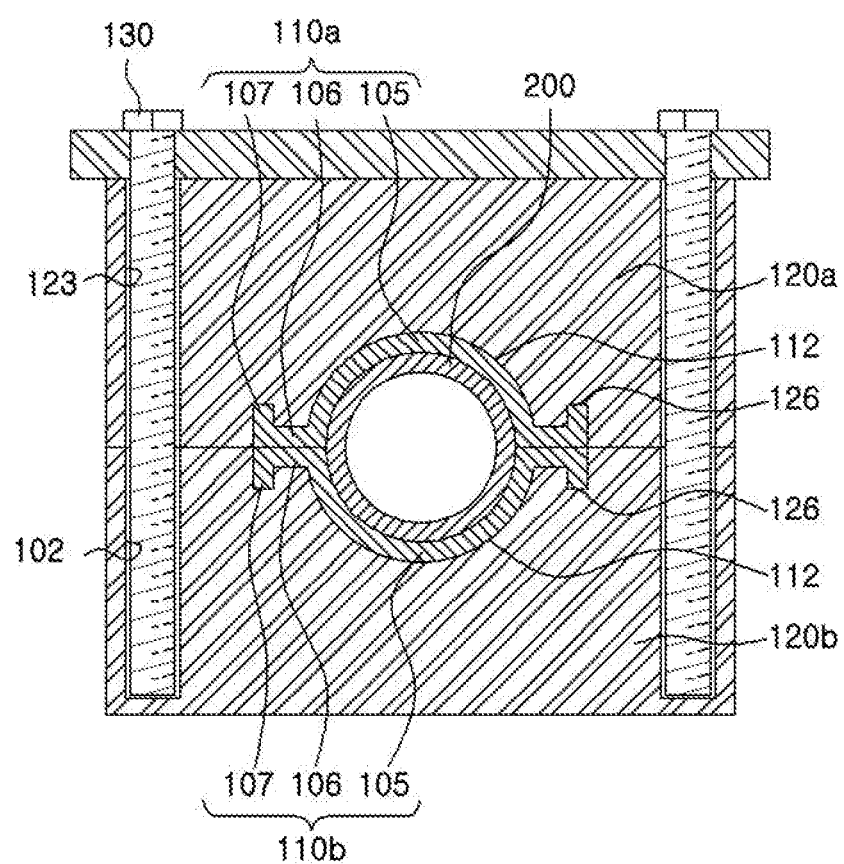
FIG. 24 is a schematic cross sectional view taken along a line "E-E" in FIG. 21.

FIG. 20 is a schematic perspective view of a pipe coupled to a clamp for a pipe according to a fifth embodiment of the present invention. FIG. 21 is an enlarged view of the clamp for a pipe according to the fifth embodiment. FIG. 22 is a schematic perspective view of the clamp for a pipe according to the fifth embodiment. FIG. 23 is a schematic exploded perspective view of the clamp for a pipe according to the fifth embodiment. FIG. 24 is a schematic cross sectional view taken along a line "E-E" in FIG. 21.

Referring to FIGS. 20 to 24, the clamp 100 for a pipe according to the fifth embodiment of the present invention may include a body 120 for fixing a pipe 200 to a predetermined installation region 20 while being coupled to the pipe 200 and a crevice corrosion prevention member 110.

The pipe 200 is a line through which working fluid such as gas, oil or the like flows and can be installed in the installation region 20 by the body 120.

The pipe 200 serves as a passage for transferring the working fluid such as gas, oil or the like to a predetermined destination. The pipe 200 may be made of stainless steel or stainless steel-based alloy.

The body 120 is provided to fix and support the pipe 200. The body 120 may be made of a plastic material. For example, the body 120 may be made of Teflon or a Teflon-containing composite synthetic resin material, or a Teflon material containing plastic or glass fiber. The body 120 can be made of various materials commonly used in this field.

A pair of bodies 120 can be assembled with the pipe 200 interposed therebetween. For example, the body 120 may include a first body 120a and a second body 120b having corresponding shapes and assembled to surround the outer circumferential surface of the pipe 200.

The first body 120a and the second body 120b may have substantially the same configuration except in the mounting holes 123 and the insertion holes 102.

Therefore, hereinafter, the body 120 will be described mainly based on the configuration of the first body (second prevention member).

The first body 120a may have a supporting portion 112 that is depressed so that a crevice corrosion prevention member 110 to be described later can be mounted. For example, the supporting portion 112 may be depressed from the first body 120a to correspond to the outer surface shape of the crevice corrosion prevention member 110. In other words, although only the configuration of the supporting portion 112 having a cylindrical shape corresponding to the outer surface of the crevice corrosion prevention member 110 is illustrated in the drawing, the present invention is not limited thereto and the supporting portion 112 may have various shapes depending on the shape of the crevice corrosion prevention member 110.

Grooves 126 may be formed at both sides of the supporting portion 112 with a predetermined distance therebetween. For example, the grooves 126 may be provided at both sides in a longitudinal direction of the supporting portion 112. Here, the longitudinal direction indicates the Y-axis direction in FIG. 21.

The grooves 126 may be depressed from the first body 120a. For example, the grooves 126 may have a shape corresponding to outer surfaces of flange portions 107 of the crevice corrosion prevention member 110 to be described later so that the flange portions 107 can be inserted thereinto.

Therefore, after the flange portions 107 are inserted into the grooves 126, the inner surfaces of the grooves 126 can be brought into contact with the outer surfaces the flange portions 107.

The grooves 126 may be provided in a width direction of the first body 120a. Here, the width direction indicates the X-axis direction in FIG. 21.

The first body 120a may have mounting holes 123 for coupling the first body 120a to the second body 120b. For example, the mounting holes 123 may be formed through the first body 120a in a thickness direction thereof at one side of the first body 120. Here, the thickness direction indicates the Z-axis direction in FIG. 21.

The second body 120b may have insertion holes 102 corresponding to the mounting holes 123 of the first body 120a. The mounting holes 123 and the insertion holes 102 can communicate with each other when the first body 120a and the second body 120b are coupled to each other. The first body 120a and the second body 120b can be coupled to each other by additional fastening members 130 screw-coupled to the mounting holes 123 and the insertion holes 102. Here, a reinforcing plate 150 may be provided on top of the first body 120a. In other words, in a state where the reinforcing plate 150 is mounted on the upper surface of the first body 120a, the first body 120a and the second body 120b can be coupled to each other by the fastening members 130.

As described above, the mounting holes 123 of the first body 120a and the insertion holes 102 of the second body 120b may have different shapes.

In other words, the mounting holes 123 may penetrate through the first body 120a in the thickness direction, and the insertion holes 102 may be depressed from the second body 120b by a predetermined depth.

The insertion holes 102 may penetrate through the second body 120b. In that case, the first body 120a and the second body 120b may have the same shape. When the insertion holes 102 penetrate through the second body 120b, the fastening members 130 can fix the first body 120a, the second body 120b and the installation region 20 together.

The shape of the second body 120b that is coupled to the first body 120a so that the pipe 200 can be fixed is substantially the same as that of the first body 120a except the insertion holes 102.

In other words, the second body 120b may have the supporting portion 112 and the grooves 126. Since the configurations of the supporting portion 112 and the groove 126 are the same as those of the first body 120a, detailed description thereof will be omitted.

Hereinafter, the specific configuration of the crevice corrosion prevention member 110 provided at the clamp 100 for a pipe according to the fifth embodiment of the present invention will be described with reference to FIG. 25.

Figure 25:
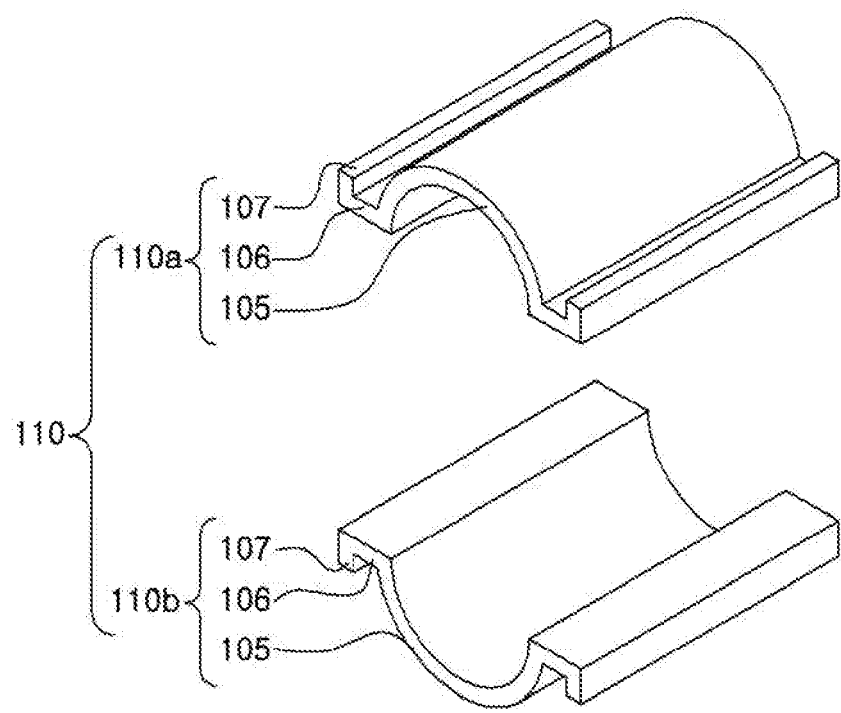
FIG. 25 is a schematic perspective view of a crevice corrosion prevention member provided at the clamp for a pipe according to the fifth embodiment.

FIG. 25 is a schematic perspective view of a crevice corrosion prevention member provided at the clamp for a pipe according to the fifth embodiment.

Referring to FIG. 25, the crevice corrosion prevention member 110 may be disposed between the pipe 200 and the body 120 to surround the outer circumferential surface of the pipe 200, and the flange of the crevice corrosion prevention member 110 may be bent toward the body 120 and inserted into the body 200. The crevice corrosion prevention member 110 may be brought into contact with the pipe 200.

The crevice corrosion prevention member 110 may be made of a metal material having higher reactivity than that of the pipe 200. For example, the crevice corrosion prevention member 110 may be made of aluminum (AL), alloy in which aluminum (AL) is mixed with tin (Sn), phosphorus (In) or the like, zinc (Zn), zinc alloy or the like. The type of the crevice corrosion prevention member 110 is not limited thereto, and it is also possible to use a metal material that is highly corrosive compared to the pipe.

First, the principle of minimizing corrosion of the pipe 200 by the crevice corrosion prevention member 200 will be described.

When two metals of different materials are brought into contact with each other in an environment where electrolyte such as rainwater or moisture in air exists, a potential is generated due to a potential difference between the two metals. At this time, a relatively more active metal serves as an anode and a relatively less active metal serves as a cathode. The anode loses electrons and is oxidized. Thus, the anode is corroded. The cathode receives electrons and is reduced. Thus, the cathode is protected from corrosion. Cathodic protection is a technique for protecting corrosion by using the above principle. The anode at this time is referred to as a "sacrificial anode".

In other words, in the clamp 100 for a pipe according to the fifth embodiment of the present invention, the crevice corrosion preventing portion 200 serves as the sacrificial anode and thus can minimize the corrosion of the pipe 200.

The crevice corrosion prevention member 110 may include: a first prevention member 110a mounted on the supporting portion 112 of the first body 120a to be in contact with a part of the outer circumferential surface of the pipe 200; and a second prevention member 110b mounted on the supporting portion 112 of the second body 120b to be in contact with a part of the outer circumferential surface of the pipe 200 which is not in contact with the first prevention member 110a.

At this time, the first prevention member 110a and the second prevention member 110b can have corresponding shapes. Therefore, hereinafter, the configuration of the first prevention member 110a will be mainly described.

The first prevention member 110a may include: a corrosion portion 105 having a shape corresponding to the outer circumferential surface of the pipe 200 and having an inner surface to be in contact with the outer circumferential surface of the pipe 200; a connection portion 106 extending outward in a radial direction from the corrosion portion 105; and flange portions 107 bent from a leading end of the connection portion 106 toward the first body 120a.

The outer circumferential surface of the corrosion portion 105 may have a shape corresponding to the supporting portion 112 of the first body 120a. The inner circumferential surface of the corrosion portion 105 may have a shape corresponding to the outer circumferential surface of the pipe 200.

Therefore, the outer circumferential surface can be mounted on and fixed to the supporting portion 112 of the first body 120a, and the inner circumferential surface can be brought into contact with the pipe 200. Accordingly, the corrosion of the pipe 200 can be minimized.

The connection portion 106 can be extended outward in the radial direction from the corrosion portion 105. Here, the radial direction indicates a direction extending from left to right or vice versa in FIG. 24. The flange portions 107 bent toward the first body 120a can be provided at the leading ends of the connection portion 106.

The flange portions 107 can be inserted into the grooves 126 of the first body 120a. For example, the flange portions 107 can be provided in a width direction to correspond to the grooves 126. When the flange portions 107 are inserted into the grooves 126, the inner circumferential surfaces of the grooves 126 can be brought into contact with the outer circumferential surfaces of the flange portions 107.

As described above, the second prevention member 110b may have a shape corresponding to that of the first prevention member 110a. For example, the second prevention member 110b may include a corrosion portion 105, a connection portion 106, and flange portions 107. Since the configurations of the corrosion portion 105, the connection portion 106 and the flange portions 107 of the second prevention member 110b are the same as those of the first prevention member 110a, detailed description thereof will be omitted.

When the clamp 100 for a pipe is coupled, the connection portions 106 of the first prevention member 110a and the second prevention member 110b are brought into contact with each other and surround the outer circumferential surface of the pipe 200.

In the clamp 100 for a pipe according to the fifth embodiment of the present invention, the grooves 126 are formed in the body 120 and the flange portions 107 of the crevice corrosion prevention member 110 are inserted into the grooves 126. Accordingly, it is possible to minimize the phenomenon that external water or moisture flows into the gap between the crevice corrosion prevention member 110 and the body 120.

Therefore, it is possible to minimize the phenomenon that the crevice corrosion prevention member 110 is oxidized by external water or moisture. As a result, the crevice corrosion prevention member 110 can minimize the corrosion of the pipe 200.

As described above, the present invention is advantageous in that the contact with external moisture and oxygen can be minimized because the crevice corrosion prevention member is not exposed in the body of the clamp. Further, the present invention is advantageous in that the crevice corrosion prevention member can be easily fixed to the body because the ends of the crevice corrosion prevention member are supported by the opening walls of the body. Moreover, the present invention is advantageous in that it is possible to prevent corrosion products generated by the corrosion of the crevice corrosion prevention member from being generated inside the clamp by forming the coating layer on the outer circumferential surface of the pipe except the surface to be in contact with the crevice corrosion prevention member.

What is claimed is:
1. A clamp for a pipe, comprising:
  a crevice corrosion prevention member configured to surround an outer surface of a pipe; and
  a body that is assembled to allow the crevice corrosion prevention member to be disposed therein and has opening walls formed at opposite ends thereof, the pipe passing through the opening walls,
  wherein the crevice corrosion prevention member has a length that is the same as a distance between the opening walls, and ends of the crevice corrosion prevention member are supported by the opening walls, and
  wherein the crevice corrosion prevention member contains an aluminum alloy having an oxide film on a surface of the aluminum alloy so that the crevice corrosion prevention member is corroded earlier than the pipe after the oxide film is damaged under an environment in which crevice corrosion occurs,
  wherein the ends of the crevice corrosion prevention member are bent toward the body and inserted into the body,
  the body includes a first body and a second body having corresponding shapes and assembled to surround the circumferential surface of the pipe, and the first body and the second body have supporting portions that are depressed so that the crevice corrosion prevention member is mounted,
  wherein the crevice corrosion prevention member includes:
    a first prevention member mounted on the supporting portion of the first body and configured to be in contact with a part of an outer circumferential surface of the pipe; and
    a second prevention member mounted on the supporting portion of the second body and configured to be in contact with a part of the outer circumferential surface of the pipe which is not in contact with the first prevention member,
  wherein each of the first prevention member and the second prevention member includes:
    a corrosion portion having a shape corresponding to the outer circumferential surface of the pipe and having an inner surface to be in contact with the outer circumferential surface of the pipe;
    connection portions extended outward in a radial direction from the corrosion portions; and
    flange portions bent from end portions of the connection portions toward the body and disposed radially outward of the connection portions.

2. The clamp for a pipe of claim 1, wherein an inner diameter of the crevice corrosion prevention member is smaller than an inner diameter of the opening hole.

3. The clamp for a pipe of claim 1, wherein the opening hole has an inclined surface inclined such that an outside inner diameter thereof is greater than an inside inner diameter thereof.

* * * * *